US010270171B2

(12) United States Patent
Yong et al.

(10) Patent No.: US 10,270,171 B2
(45) Date of Patent: Apr. 23, 2019

(54) ELECTRONIC DEVICE AND ANTENNA

(71) Applicant: SONY MOBILE COMMUNICATIONS INC., Shinagawa-ku (JP)

(72) Inventors: Check Chin Yong, Tokyo (JP); Tatsuya Nagae, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/344,176

(22) Filed: Nov. 4, 2016

(65) Prior Publication Data

US 2017/0141470 A1    May 18, 2017

(30) Foreign Application Priority Data

Nov. 13, 2015  (JP) ................. 2015-223130

(51) Int. Cl.
*H01Q 7/06* (2006.01)
*H01Q 1/22* (2006.01)
*H01Q 1/38* (2006.01)
*H04B 5/00* (2006.01)
*H01Q 1/24* (2006.01)
(Continued)

(52) U.S. Cl.
CPC ............ *H01Q 7/06* (2013.01); *H01Q 1/2291* (2013.01); *H01Q 1/243* (2013.01); *H01Q 1/248* (2013.01); *H01Q 1/38* (2013.01); *H01Q 5/20* (2015.01); *H01Q 5/314* (2015.01); *H01Q 5/35* (2015.01); *H01Q 7/00* (2013.01); *H01Q 9/0421* (2013.01); *H01Q 21/28* (2013.01); *H04B 5/0031* (2013.01); *H04B 5/0037* (2013.01)

(58) Field of Classification Search
CPC .......... H01Q 7/06; H01Q 1/38; H01Q 1/2291; H01Q 1/248; H01Q 5/35; H01Q 5/314; H01Q 5/20; H01Q 21/28; H01Q 9/0421; H01Q 7/00; H01Q 1/243; H04B 5/0031; H04B 5/0037
See application file for complete search history.

(56) References Cited

U.S. PATENT DOCUMENTS 9,661,446 B2 * 5/2017 Konanur ................. H01Q 7/00
2010/0222010 A1 9/2010 Ozaki et al.
(Continued)

FOREIGN PATENT DOCUMENTS

JP    2014-96612    5/2014

OTHER PUBLICATIONS

Extended European Search Report dated Mar. 21, 2017 in Patent Application No. 16197267.4.

*Primary Examiner* — Jessica Han
*Assistant Examiner* — Michael M Bouizza
(74) *Attorney, Agent, or Firm* — Xsensus LLP

(57) ABSTRACT

There is provided an electronic device including: a first antenna for wireless communication; a second antenna for near-field communication that forms a loop by being used together with the first antenna, at least a part of the second antenna being positioned at a back surface of a display region of a display; and a first filter that is provided in the first antenna or the second antenna, passes a signal of a frequency band used in the near-field communication to the first antenna, and blocks inflow of the signal of the frequency band used in the wireless communication into the second antenna.

19 Claims, 33 Drawing Sheets

(51) Int. Cl.
*H01Q 7/00* (2006.01)
*H01Q 9/04* (2006.01)
*H01Q 21/28* (2006.01)
*H01Q 5/20* (2015.01)
*H01Q 5/314* (2015.01)
*H01Q 5/35* (2015.01)

(56) References Cited

U.S. PATENT DOCUMENTS

| | | |
|---|---|---|
| 2010/0279734 A1 | 11/2010 | Karkinen et al. |
| 2010/0315389 A1 | 12/2010 | Sorrell et al. |
| 2014/0139380 A1* | 5/2014 | Ouyang ............... H01Q 7/00 343/702 |
| 2014/0152253 A1 | 6/2014 | Ozaki et al. |
| 2015/0116168 A1* | 4/2015 | Yosui .................. H01Q 7/00 343/722 |
| 2015/0180136 A1 | 6/2015 | Yosui |
| 2015/0268742 A1* | 9/2015 | Park .................... H04B 5/0031 345/179 |
| 2016/0181857 A1* | 6/2016 | Konanur ............... H01Q 7/00 320/108 |
| 2016/0365621 A1* | 12/2016 | Yong ................... H01Q 1/243 |

* cited by examiner

ELECTRONIC DEVICE AND ANTENNA

CROSS REFERENCE TO RELATED APPLICATIONS

This application claims the benefit of Japanese Priority Patent Application JP 2015-223130 filed Nov. 13, 2015, the entire contents of which are incorporated herein by reference.

BACKGROUND

The present disclosure relates to an electronic device and an antenna.

A case that covers an electronic device like a smartphone uses plastic or glass in many cases, but products using metal have been increasing in recent years. A requester can be provided with an image of a high quality by the metal being used in the case that covers the electronic device.

In addition, an electronic device that is equipped with an antenna coil and performs non-contact communication by electromagnetic induction using the antenna coil (hereinafter, also referred to as non-contact communication simply) is widespread, and many related technologies are proposed (refer to JP 2014-096612A, for example).

When metal is used in the case that covers the electronic device, non-contact communication by electromagnetic induction using the antenna coil (hereinafter, also referred to as non-contact communication simply) is affected particularly. When the electronic device is equipped with the antenna coil for performing the non-contact communication, eddy current generated on a surface of the metal affects the non-contact communication if the surface of the case formed of metal is put on a reader/writer. Thus, when the metal is used in the case that covers the electronic device, a user puts a surface that is not formed of the metal, for example, a display surface, on the reader/writer, in order to perform the non-contact communication.

SUMMARY

In order to allow the user to put the display surface of the electronic device on the reader/writer to perform the non-contact communication, a mark representing the position that is put on the reader/writer is to be provided for the purpose of user friendly or by a request from a communication business operator. Also, in order to allow the display surface of the electronic device to be put on the reader/writer to perform the non-contact communication, it is desirable to expand the area capable of the non-contact communication, to reduce read errors in the reader/writer. Note that the mark is unable to be attached to the display region of the display, and thus the mark is to be attached to the periphery portion of the display surface, and the electronic device is to be configured so that the antenna coil is positioned under the mark.

However, when the mark is attached to the periphery portion of the display surface, and the electronic device is configured in such a manner that the antenna coil is positioned under the mark, the antenna coil interferes an antenna for performing wireless communication with a base station or the like (for example, a cellular antenna for performing wireless communication by a cellular method), which is provided at the periphery portion of the display surface in the same way.

Thus, the present disclosure proposes a new and improved electronic device and an antenna, which allow the wireless communication antenna and the antenna coil to coexist effectively.

According to an embodiment of the present disclosure, there is provided an electronic device including: a first antenna for wireless communication; a second antenna for near-field communication that forms a loop by being used together with the first antenna, at least a part of the second antenna being positioned at a back surface of a display region of a display; and a first filter that is provided in the first antenna or the second antenna, passes a signal of a frequency band used in the near-field communication to the first antenna, and blocks inflow of the signal of the frequency band used in the wireless communication into the second antenna.

According to an embodiment of the present disclosure, there is provided an antenna including: a first antenna for wireless communication; and a second antenna for near-field communication that forms a loop by being used together with the first antenna, at least a part of the second antenna being positioned at a back surface of a display region of a display.

As described above, according to an embodiment of the present disclosure, the new and improved electronic device and the antenna, which allow the wireless communication antenna and the antenna coil to coexist effectively, can be provided.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
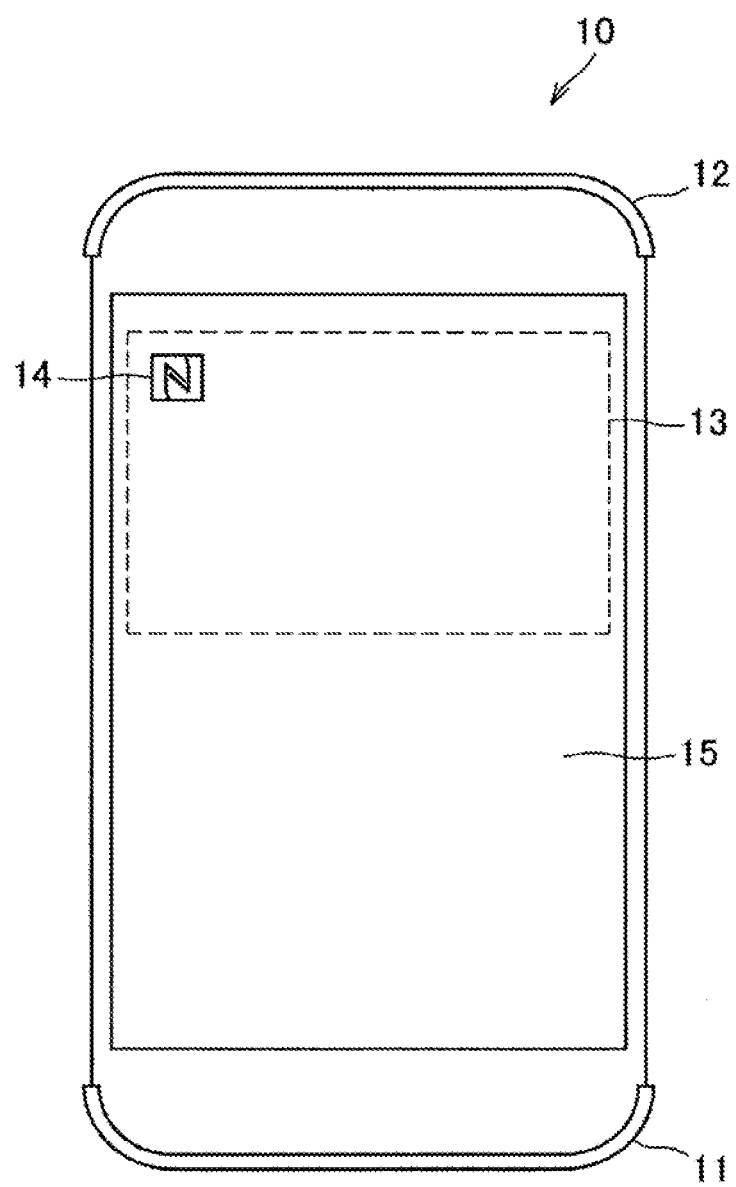
FIG. 1 is an explanatory diagram illustrating an exemplary configuration of an electronic device 10.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Embodiment of Present Disclosure
1.1. Overview
1.2. Exemplary Configuration
1.3. Exemplary Variant
2. Conclusion 1. Embodiment of Present Disclosure

[1.1. Overview]

First, an overview of an embodiment of the present disclosure will be described.

As described above, a case that covers an electronic device like a smartphone uses plastic or glass in many cases, but a product using metal has increased in recent years. An image of high quality can be given to a requester by the metal being used in the case that covers the electronic device.

On the other hand, the metal being used in the case that covers the electronic device has an influence on non-contact communication by electromagnetic induction that uses the antenna coil particularly. When the electronic device is equipped with the antenna coil for performing the non-contact communication, eddy current generated on a surface of the metal has an influence on the non-contact communication if a surface of the case formed of metal is put on a reader/writer. Thus, when the metal is used in the case that covers the electronic device, a user puts a surface that is not formed of the metal, for example, a display surface, on the reader/writer, in order to perform the non-contact communication.

In order to allow the user to put the display surface of the electronic device on the reader/writer to perform the non-contact communication, a mark representing the position that is put on the reader/writer is to be provided. However, a mark is unable to be attached to a display region of the display.

FIG. 1 is an explanatory diagram illustrating an exemplary configuration of an electronic device 10. The electronic device 10 illustrated in FIG. 1 is to describe the overview of the embodiment of the present disclosure.

The electronic device 10 illustrated in FIG. 1 is a smartphone, for example, and includes a main antenna 11 for wireless communication (hereinafter, also referred to as "cellular communication") by a cellular method which is provided at a lower portion of the electronic device 10, a cellular communication sub-antenna 12 which is provided at an upper portion of the electronic device 10, and an antenna coil 13 that is provided under a display region 15 of a display.

The main antenna 11, the sub-antenna 12, and the antenna coil 13 are provided in an inner portion of the electronic device 10, but in FIG. 1 the main antenna 11 and the sub-antenna 12 are illustrated in the drawing to be provided on a front surface of the electronic device 10, for convenience of explanation. Also, a back surface of the electronic device 10 illustrated in FIG. 1 is covered with a cover made of metal such as aluminum.

Note that the sub-antenna 12 is not limited to usage in the cellular communication. The sub-antenna 12 may be used in a wireless LAN and a global navigation satellite system (GNSS), such as a global positioning network (GPS), GLONASS, and GALILEO as well.

In order to cause the user to perform the non-contact communication by using the electronic device 10 illustrated in FIG. 1, not the back surface covered with the metal but the display surface is directed to the reader/writer. When the electronic device 10 is put on the reader/writer, the user can know which position of the electronic device 10 is to be put on the reader/writer if there is a mark representing a rough position of the antenna coil 13. However, a mark 14 for putting the electronic device 10 on the reader/writer is unable to be attached to the display region 15 of the display as in FIG. 1.

Thus, it is desirable that the electronic device 10 is configured such that the mark 14 is attached to a periphery portion of the display surface and the antenna coil 13 is positioned under the mark 14.

Figure 2:
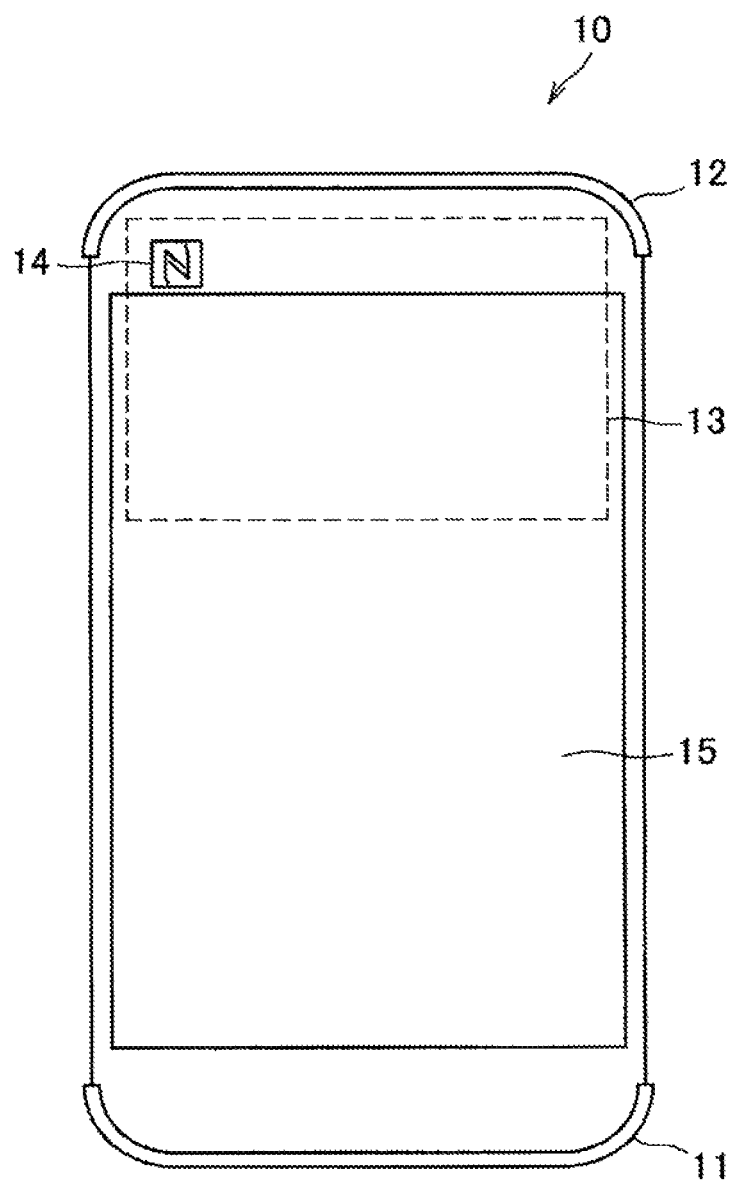
FIG. 2 is an explanatory diagram illustrating an exemplary configuration of an electronic device 10.

FIG. 2 is an explanatory diagram illustrating an exemplary configuration of the electronic device 10. FIG. 2 illustrates an exemplary configuration of the electronic device 10 in which the antenna coil 13 is moved upward from the state of FIG. 1. As described above, a part of the antenna coil 13 is positioned at an outside of the display region 15 of the display, so that the mark 14 can be attached to the outside of the display region 15 of the display as in FIG. 2.

However, when the antenna coil 13 is positioned as illustrated in FIG. 2, the antenna coil 13 gets close to the sub-antenna 12 this time. When the sub-antenna 12 and the antenna coil 13 get close to each other, the sub-antenna 12 and the antenna coil 13 impair the performance mutually.

Thus, the present case discloser has performed an intense study with regard to a technology that allows an antenna for performing near-field non-contact communication with a reader/writer and an antenna for performing wireless communication with a base station or the like to coexist effectively, in consideration of the above point. As a result, the present case discloser has devised a technology that allows an antenna for performing near-field non-contact communication with a reader/writer and an antenna for performing wireless communication with a base station or the like to coexist effectively, as described below.

Figure 3:
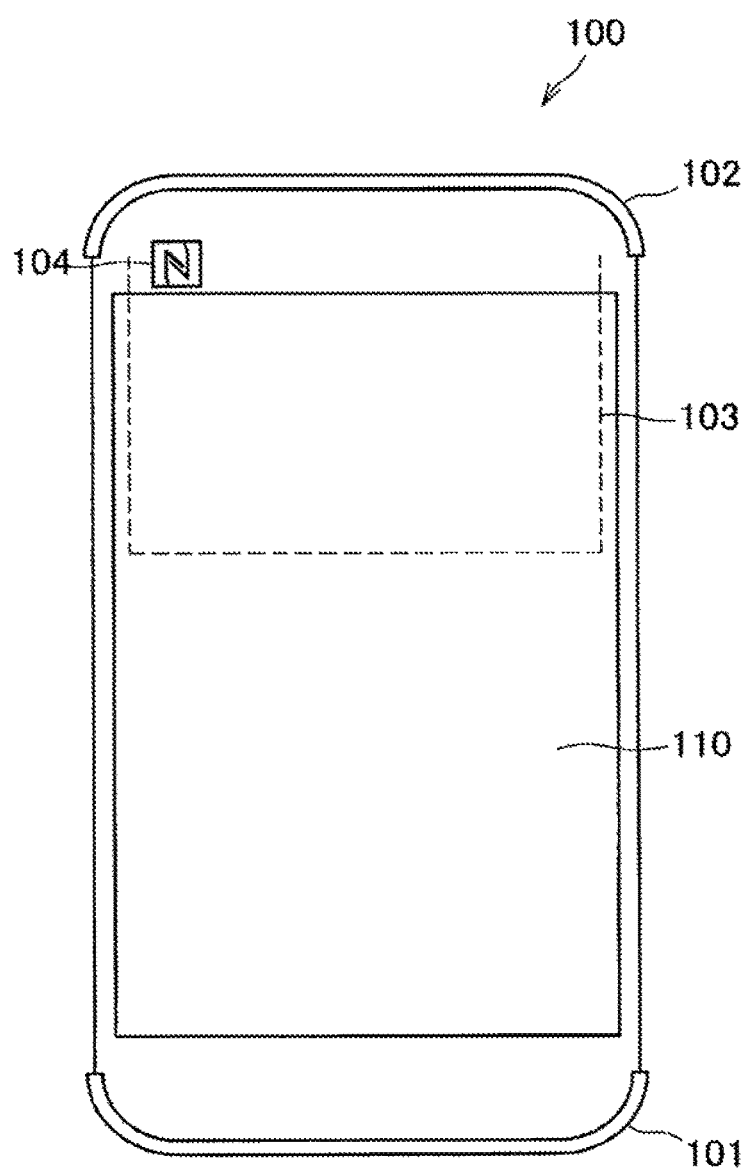
FIG. 3 is an explanatory diagram illustrating an overview of an embodiment of the present disclosure.

FIG. 3 is an explanatory diagram illustrating the overview of the embodiment of the present disclosure. FIG. 3 illustrates an exemplary configuration of an electronic device 100 in which an antenna for performing near-field non-contact communication with the reader/writer and an antenna for performing wireless communication with a base station or the like coexist.

The electronic device 100 illustrated in FIG. 3 is a smartphone, for example, and includes a cellular communication main antenna 101 that is provided at a lower portion of the electronic device 100, a cellular communication sub-antenna 102 that is provided at an upper portion of the electronic device 100, and a near-field non-contact communication antenna 103 that is provided under a display region 110 of the display. The main antenna 101, the sub-antenna 102, and the near-field non-contact communication antenna 103 are provided in an inner portion of the electronic device 100. Also, a back surface of the electronic device 100 illustrated in FIG. 3 is covered with a cover of metal such as aluminum.

The electronic device 100 according to the embodiment of the present disclosure is characterized in configuring a loop antenna with the sub-antenna 102 and the near-field non-contact communication antenna 103. When the user of the electronic device 100 puts the display surface on the reader/writer to perform non-contact communication between the electronic device 100 and the reader/writer, the user may put the mark 104 provided on the outside of the display region 110 of the display on the reader/writer.

Also, as illustrated in FIG. 3, the electronic device 100 expands the operation area of the near-field non-contact communication as compared with the electronic device 10 illustrated in FIG. 1 and other drawings, by configuring the loop antenna with the sub-antenna 102 and the near-field non-contact communication antenna 103. Note that the sub-antenna 102 may be used in a wireless LAN, a GNSS such as GPS, GLONASS, and GALILEO, and Bluetooth (registered trademark) as well.

Figure 4:
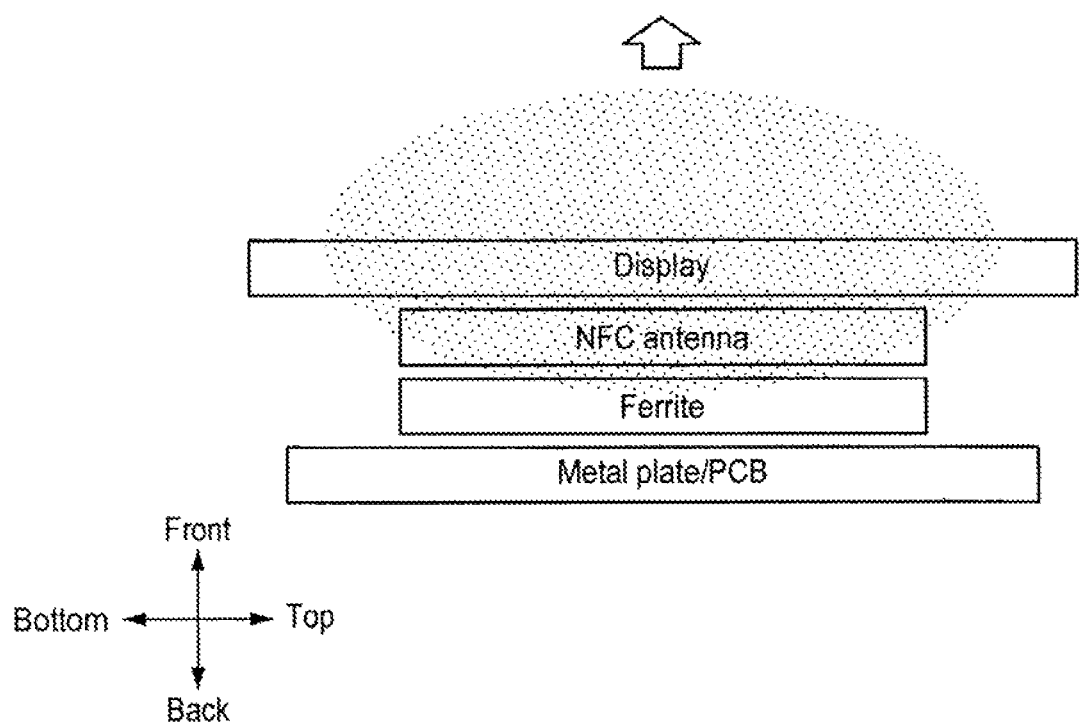
FIG. 4 is an explanatory diagram illustrating an operation area of near-field non-contact communication by an electronic device 10.

FIG. 4 is an explanatory diagram illustrating the operation area of the near-field non-contact communication by the electronic device 10 illustrated in FIG. 1 and other drawings. When the antenna coil 13 is provided under the display region 15 of the display as illustrated in FIG. 4, the operation area of the near-field non-contact communication by the electronic device 10 is only in the upward direction (the direction of "Front" in FIG. 4) of the display surface.

Figure 5:
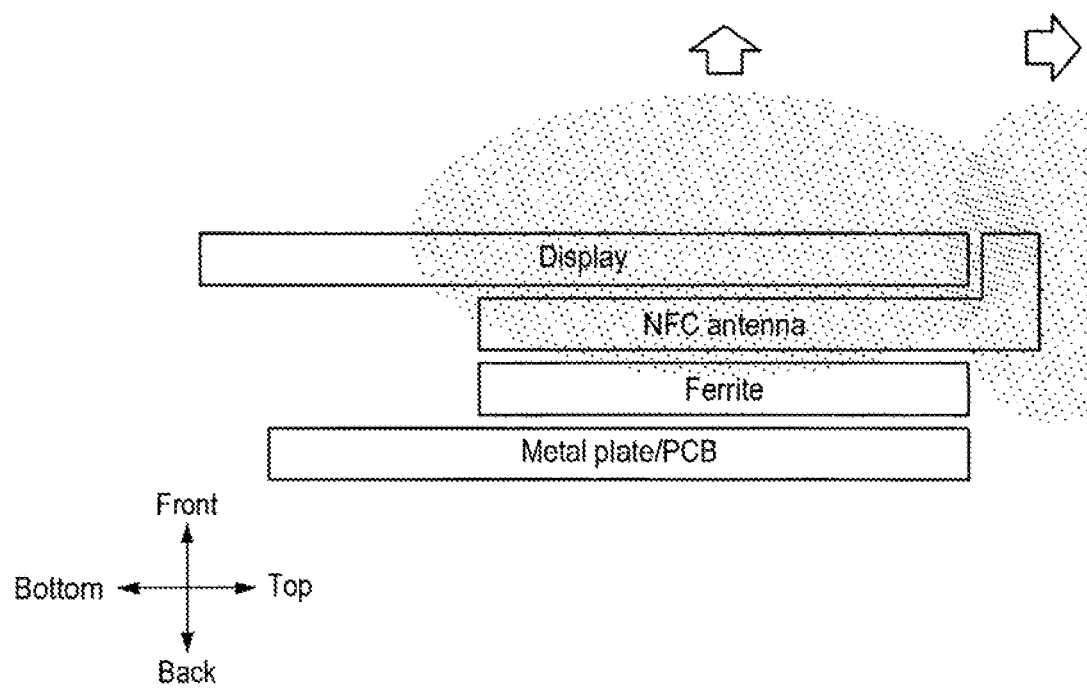
FIG. 5 is an explanatory diagram illustrating an operation area of near-field non-contact communication by an electronic device 100.

FIG. 5 is an explanatory diagram illustrating the operation area of the near-field non-contact communication by the electronic device 100 illustrated in FIG. 3. By configuring the loop antenna by the sub-antenna 102 and the near-field non-contact communication antenna 103 as illustrated in FIG. 3, the electronic device 100 can expand the operation area of the near-field non-contact communication, not only in the upward direction (the direction of "Front" in FIG. 5) of the display surface, but also the forward direction (the direction of "Top" in FIG. 5) of the electronic device 100 and the back surface direction (the direction of "Back" in FIG. 5) as compared with the electronic device 10 illustrated in FIG. 1 and other drawings. The electronic device 100 expands the operation area of the near-field non-contact communication as described above, and thus can reduce occurrence of read errors in the reader/writer.

In the above, the overview of the embodiment of the present disclosure has been described. Next, the embodiment of the present disclosure will be described in more detail.

[1.2. Exemplary Configuration]

Figure 6:
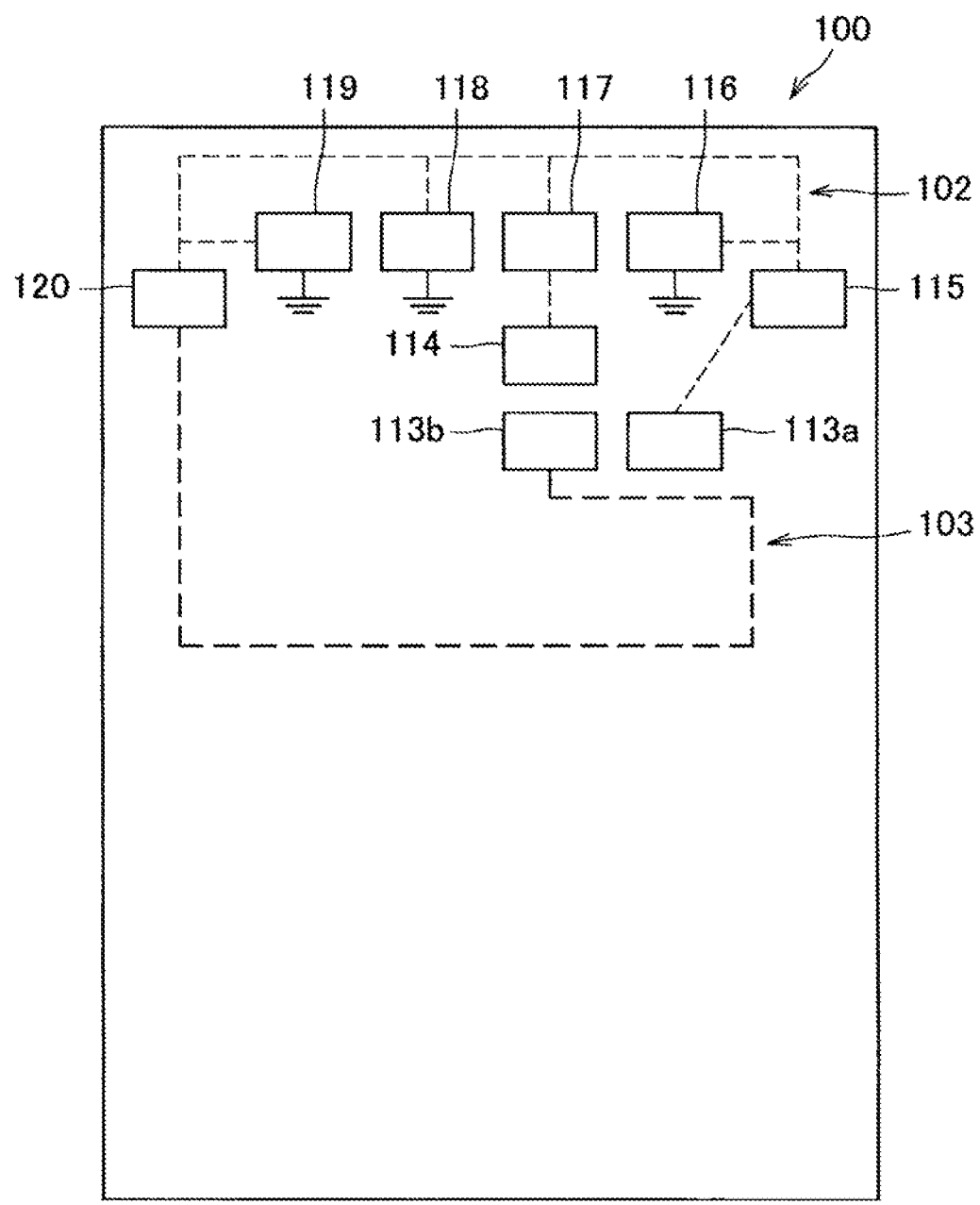
FIG. 6 is an explanatory diagram illustrating an exemplary configuration of an electronic device 100 according to an embodiment of the present disclosure.

FIG. 6 is an explanatory diagram illustrating the exemplary configuration of the electronic device 100 according to the embodiment of the present disclosure. The electronic device 100 illustrated in FIG. 6 includes filters or matching components (referred to as "filter" simply in the following description) 115, 116, 117, 118, 119, 120, in addition to the above sub-antenna 102 and the near-field non-contact communication antenna 103.

The sub-antenna 102 is provided in a periphery portion of the upper portion of the electronic device 100, and is produced by a laser direct structuring (LDS) antenna, a flex film, metal press processing, and the like, for example. The near-field non-contact communication antenna 103 is provided under the display region 110 of the display, for example, as illustrated in FIG. 3, and is produced by an LDS film, a flex film, and the like, for example.

The filters 115, 120 are low-pass filters, for example, and pass a signal of the near-field non-contact communication, and block a signal of the cellular communication. The sub-antenna 102 and the near-field non-contact communication antenna 103 are connected via the filters 115, 120, so that one turn of a loop antenna for the near-field non-contact communication is formed.

Note that, in FIG. 6, two feeds (electricity feeding points) 113a, 113b are formed on a printed circuit board (PCB). The feed 113a is connected to the sub-antenna 102, and the feed 113b is connected to the near-field non-contact communication antenna 103.

Each of the filters 116, 118, 119 is provided between the sub-antenna 102 and a ground point. The filter 117 is provided between the sub-antenna 102 and the feed 114. The filters 116, 117, 118, 119 may include matching components such as matching circuits. Thus, the filters 116, 118, 119 can function as an example of a communication characteristic adjustment unit of an embodiment of the present disclosure. Also, the matching components such as the matching circuits alone may be provided at the positions of the filters 116, 117, 118, 119, instead of the filters.

The filters 116, 117, 118, 119 are provided to tune the cellular communication sub-antenna 102. Thus, all of the filters 116, 117, 118, 119 block the signal of the near-field non-contact communication. Also, the filters 116, 117, 118, 119 may be used to tune a GPS antenna and a wireless LAN antenna that are not illustrated in FIG. 6.

The electronic device 100 according to the embodiment of the present disclosure has the configuration illustrated in FIG. 6, in order to allow the antenna for performing the near-field non-contact communication with the reader/writer and the antenna for performing the wireless communication with the base station or the like to coexist effectively.

In the electronic device 100 illustrated in FIG. 6, the sub-antenna 102 and the near-field non-contact communication antenna 103 form the antenna coil, but the present disclosure is not limited to such an example, and the main antenna 101 and the near-field non-contact communication antenna 103 may form the antenna coil.

The electronic device 100 according to the embodiment of the present disclosure may further include an antenna coil for near-field non-contact charging.

Figure 7:
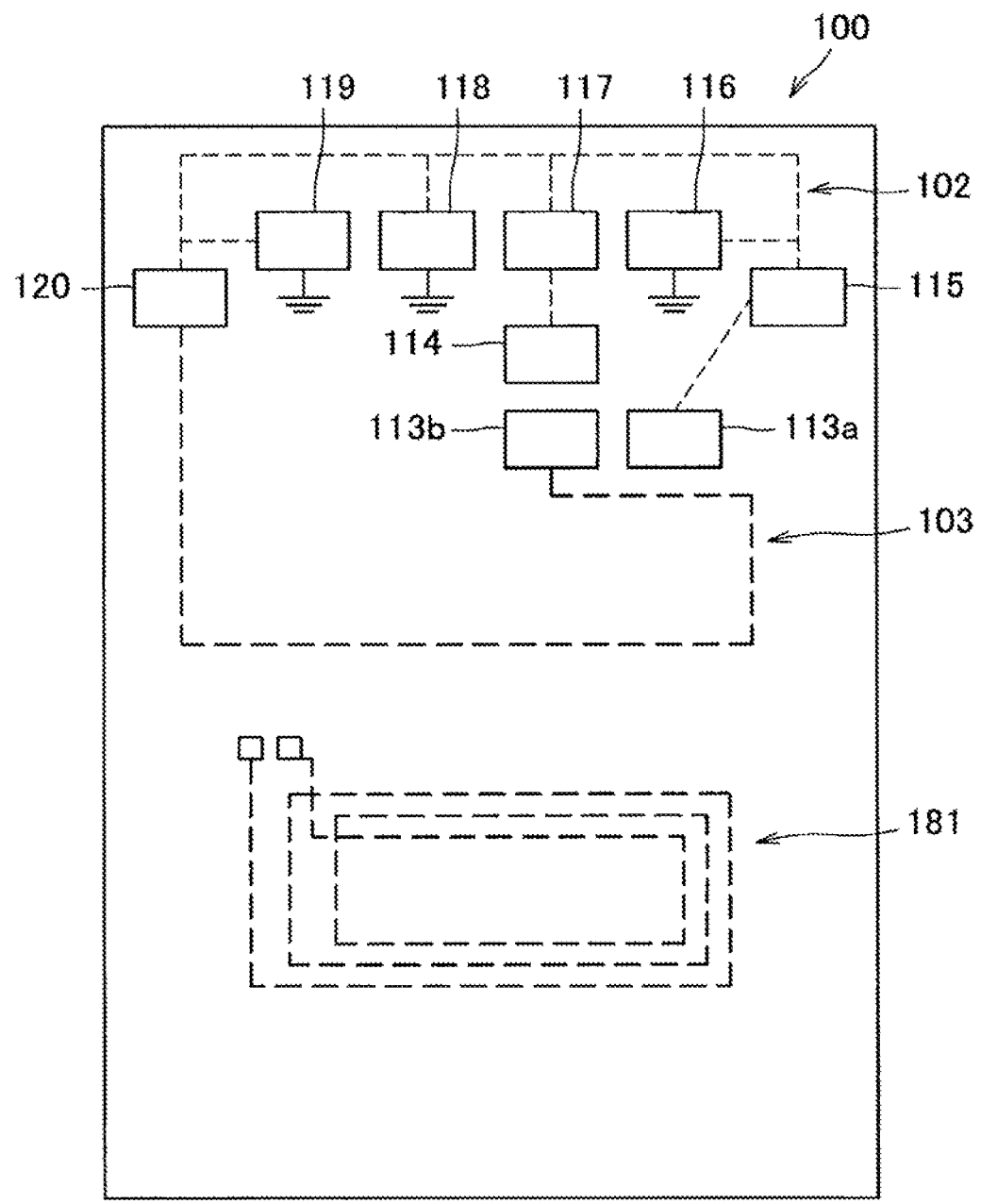
FIG. 7 is an explanatory diagram illustrating another exemplary configuration of an electronic device 100 according to the above embodiment.

FIG. 7 is an explanatory diagram illustrating another exemplary configuration of the electronic device 100 according to the embodiment of the present disclosure. FIG. 7 illustrates an exemplary configuration of the electronic device 100 in which an antenna coil 181 for the near-field non-contact charging is provided additionally in the electronic device 100 illustrated in FIG. 6. As described above, the antenna coil 181 for the near-field non-contact charging may be provided in the electronic device 100. Note that the number of turns of the antenna coil 181 is 3 turns in FIG. 7, but is not limited to such an example. Also, a near-field non-contact charging feed is connected to the antenna coil 181.

Figure 8:
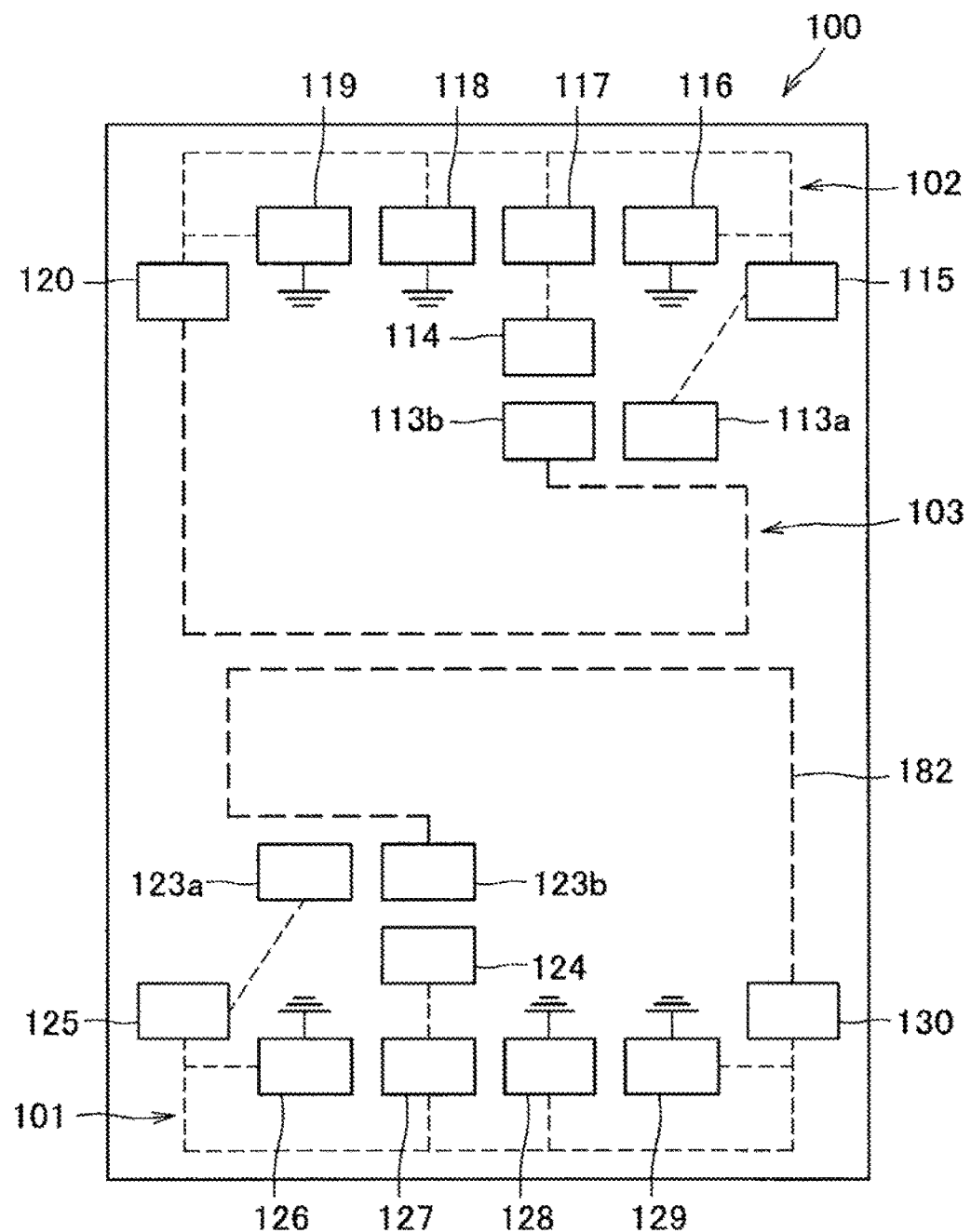
FIG. 8 is an explanatory diagram illustrating another exemplary configuration of an electronic device 100 according to the above embodiment.

FIG. 8 is an explanatory diagram illustrating another exemplary configuration of the electronic device 100 according to the embodiment of the present disclosure. FIG. 8 illustrates an exemplary configuration of the electronic device 100, when the near-field non-contact charging antenna 182 is shared with the main antenna 101 to form a loop antenna for the near-field non-contact charging. FIG. 8 includes filters 125, 126, 127, 128, 129, 130, in addition to the configuration illustrated in FIG. 6.

The filters 125, 130 are the low-pass filters, for example, and pass a signal of the near-field non-contact charging, and block a signal of the cellular communication. The main antenna 101 and the near-field non-contact charging antenna 182 are connected via the filters 125, 130, so as to form one turn of the loop antenna for the near-field non-contact charging. Note that FIG. 8 illustrates a state in which two feeds 123a, 123b are formed on the PCB. The feed 123a is connected to the main antenna 101, and the feed 123b is connected to the near-field non-contact charging antenna 182.

Each of the filters 126, 128, 129 is provided between the main antenna 101 and the ground point. The filter 127 is provided between the main antenna 101 and a feed 124. The filters 126, 127, 128, 129 may include matching components, such as matching circuits. Also, the matching components such as the matching circuits alone may be provided at the positions of the filters 126, 127, 128, 129, instead of the filters.

The filters 126, 127, 128, 129 are provided to tune the cellular communication main antenna 101. Thus, all of the filters 126, 127, 128, 129 block the signal of the near-field non-contact charging.

In the electronic device 100 illustrated in FIG. 6, the near-field non-contact communication antenna 103 itself does not have a loop of one turn or more, but the present disclosure is not limited to such an example. The non-contact communication antenna for performing the near-field non-contact communication integrally with the sub-antenna 102 can take various forms to adjust the performance of the near-field non-contact communication.

Figure 9:
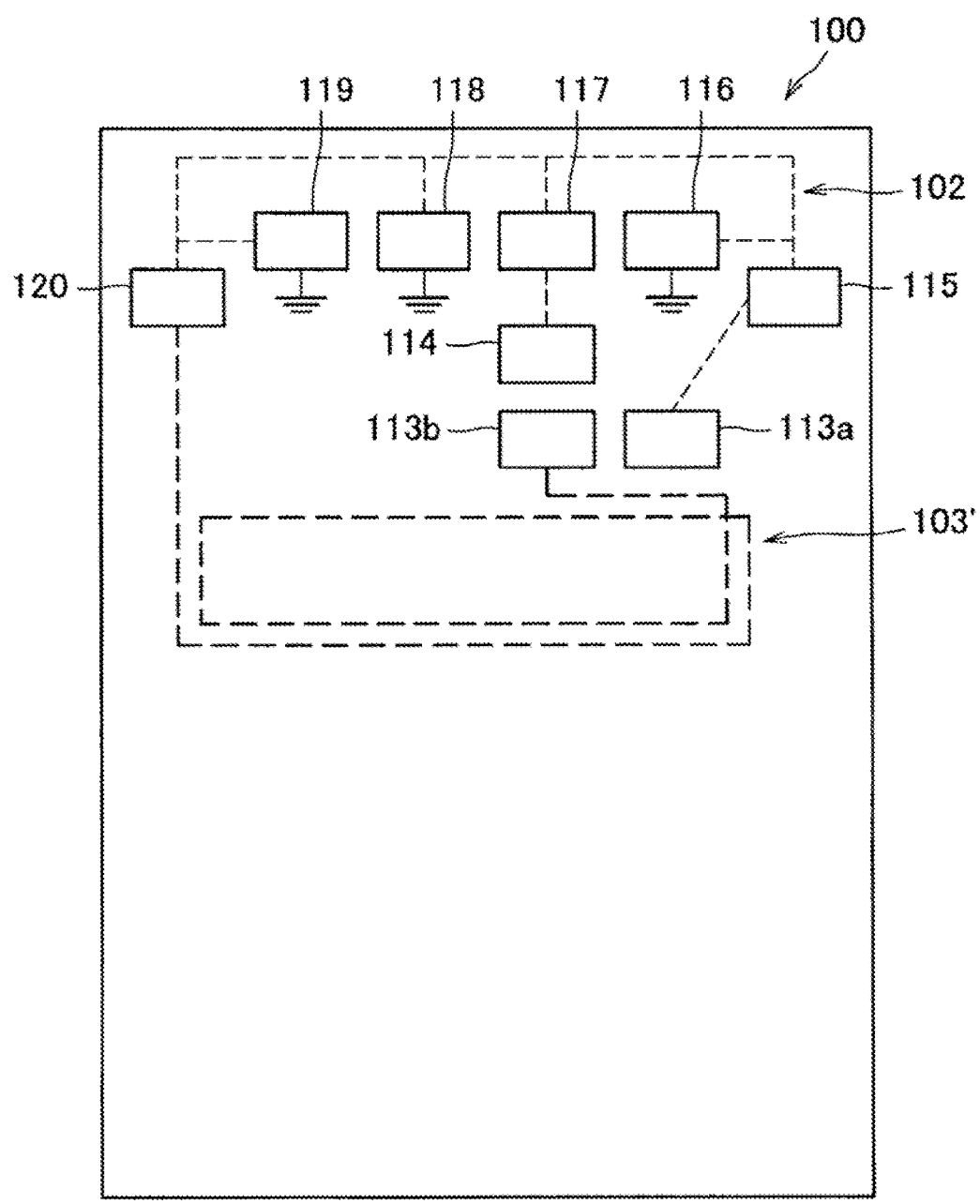
FIG. 9 is an explanatory diagram illustrating another exemplary configuration of an electronic device 100 according to the above embodiment.

FIG. 9 is an explanatory diagram illustrating another exemplary configuration of the electronic device 100 according to the embodiment of the present disclosure. FIG. 9 illustrates an exemplary configuration of the electronic device 100 that includes a near-field non-contact communication antenna 103' having one turn in itself, instead of the near-field non-contact communication antenna 103 illustrated in FIG. 6.

Figure 10:
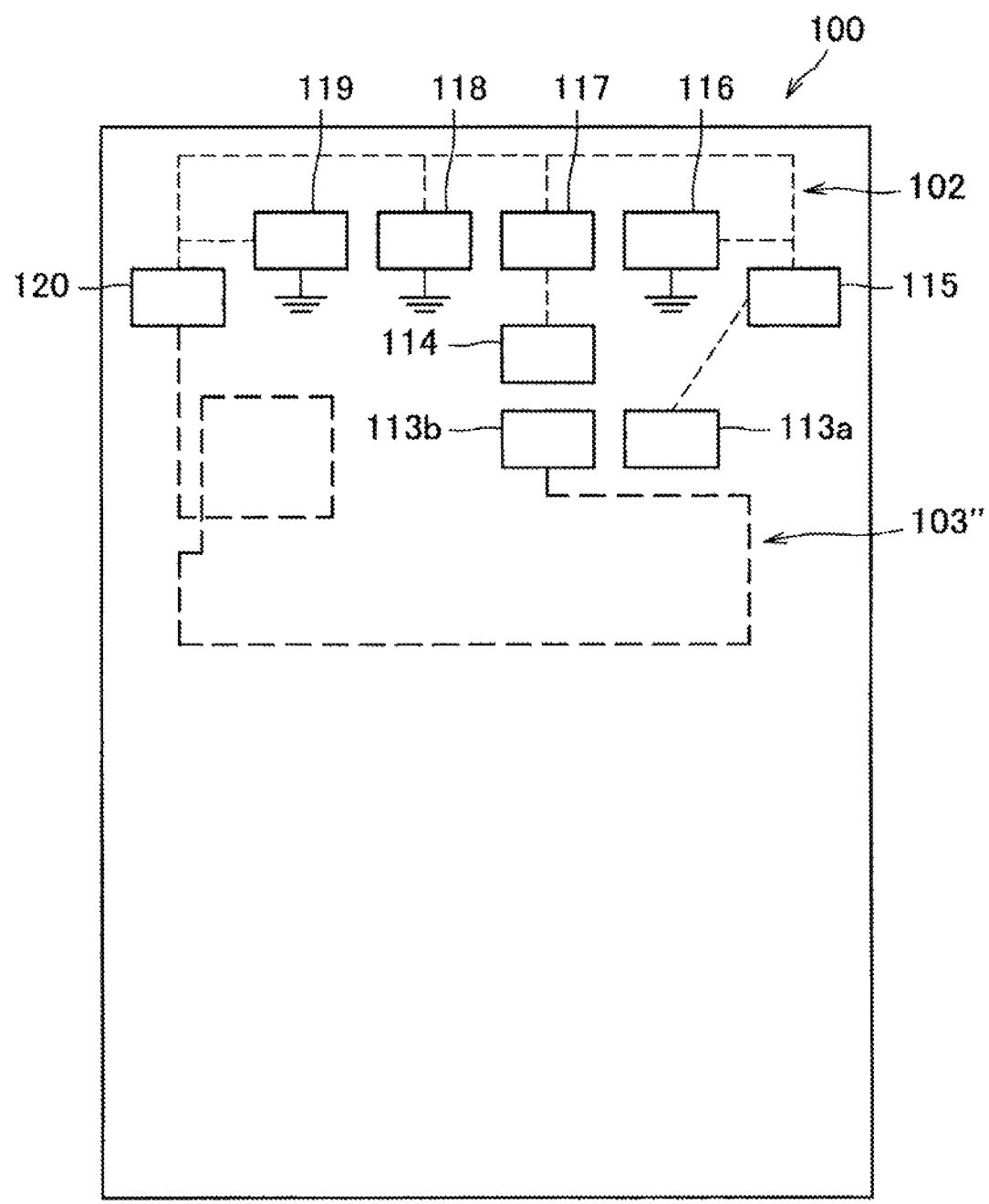
FIG. 10 is an explanatory diagram illustrating another exemplary configuration of an electronic device 100 according to the above embodiment.

FIG. 10 is an explanatory diagram illustrating another exemplary configuration of the electronic device 100 according to the embodiment of the present disclosure. FIG. 10 illustrates an exemplary configuration of the electronic device 100 that includes a near-field non-contact communication antenna 103" having one turn locally in itself, instead of the near-field non-contact communication antenna 103 illustrated in FIG. 6.

As described above, the near-field non-contact communication antenna for performing the near-field non-contact communication integrally with the sub-antenna 102 can take various forms. As a matter of course, it is needless to say that the form of the non-contact communication antenna for performing the near-field non-contact communication integrally with sub-antenna 102 is not limited to the ones illustrated in the above drawings.

The near-field non-contact communication antenna 103 illustrated in FIG. 6 may also be used at the time of the near-field non-contact charging.

Figure 11:
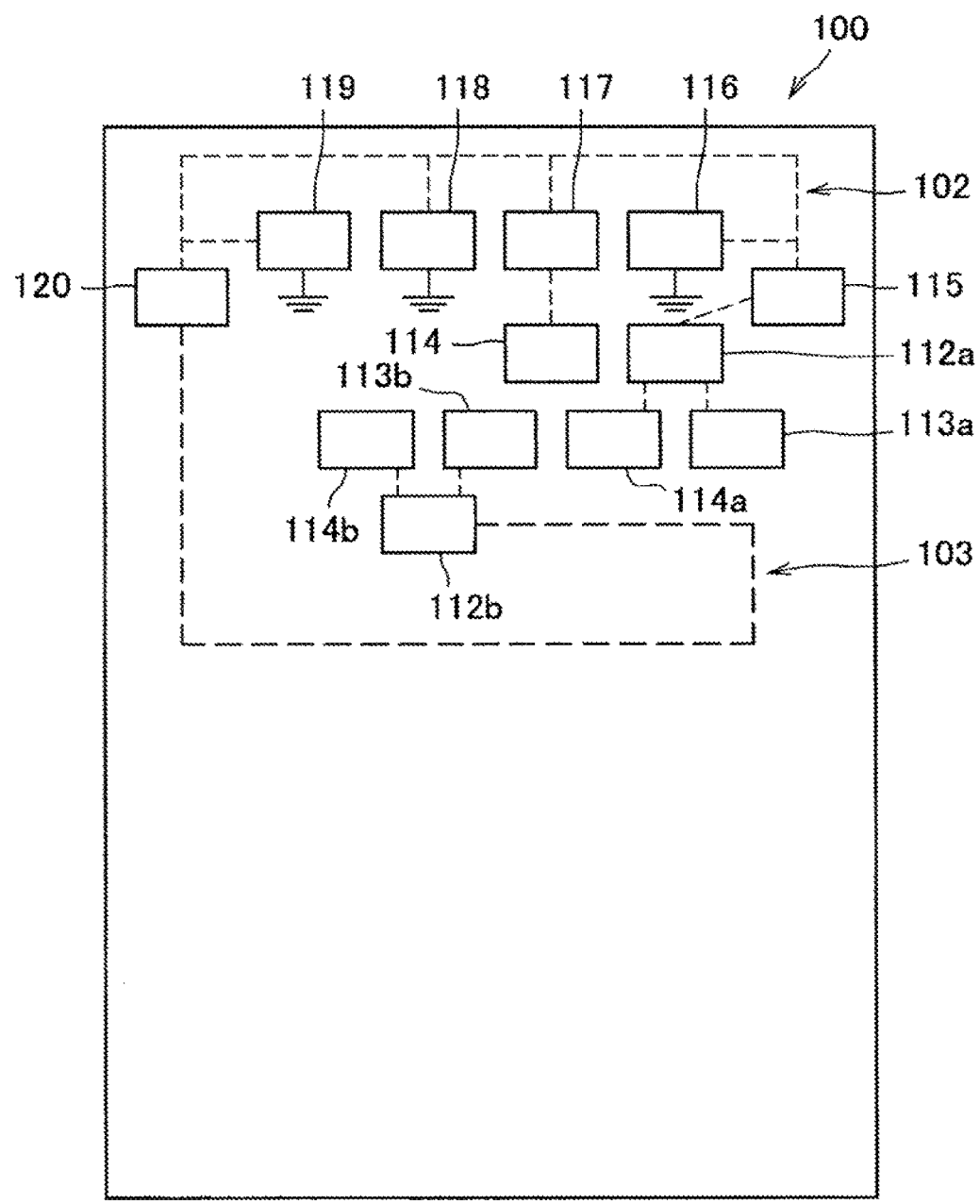
FIG. 11 is an explanatory diagram illustrating another exemplary configuration of an electronic device 100 according to the above embodiment.

FIG. 11 is an explanatory diagram illustrating another exemplary configuration of the electronic device 100 according to the embodiment of the present disclosure. FIG. 11 illustrates an exemplary configuration of the electronic device 100, when the near-field non-contact communication antenna 103 is also used in the near-field non-contact charging.

Figure 12A:
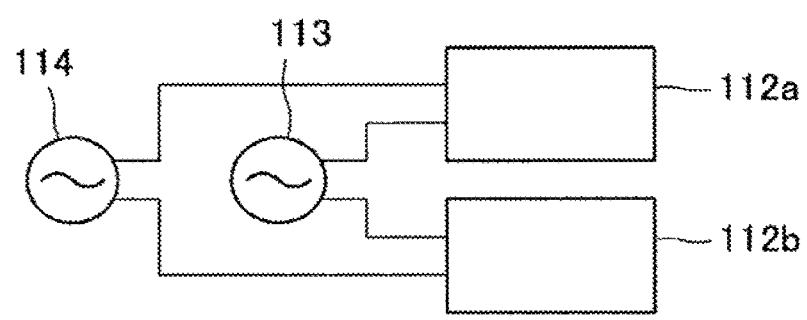
FIG. 12A is an explanatory diagram that schematically illustrates a situation in which a duplexer and the like is connected to two feeds.

The electronic device 100 illustrated in FIG. 11 is configured in such a manner that duplexers 112a, 112b for sharing the near-field non-contact 16 communication antenna 103 for the near-field non-contact communication and the near-field non-contact charging and near-field non-contact charging feeds 114a, 114b are added to the electronic device 100 illustrated in FIG. 6. Also, FIG. 12A is an explanatory diagram that schematically illustrates a situation in which the duplexers 112a, 112b are connected to two feeds 113, 114. Note that, FIGS. 11, 12A illustrate the situation in which the duplexers 112a, 112b are connected to the two feeds 113, 114, but what is connected to the two feeds 113, 114 may be a duplexer, a filter, or a switch.

The duplexers 112a, 112b are provided to share the near-field non-contact communication antenna 103 for the near-field non-contact communication and the near-field non-contact charging. The duplexers 112a, 112b can prevent the signal of the near-field non-contact communication from flowing into the system of the near-field non-contact charging, and the signal of the near-field non-contact charging from flowing into the near-field non-contact communication, respectively.

The electronic device 100 can share the near-field non-contact communication antenna 103 for the near-field non-contact communication and the near-field non-contact charging, by providing the duplexers 112a, 112b as illustrated in FIGS. 11, 12A.

Figure 12B:
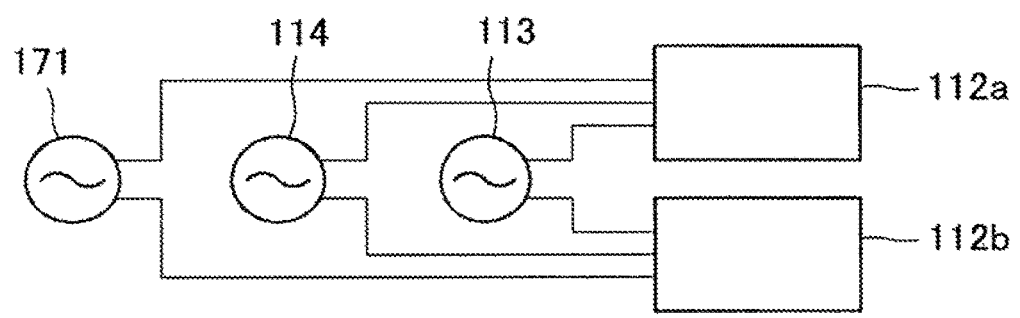
FIG. 12B is an explanatory diagram that schematically illustrates a situation in which a duplexer and the like is connected to two feeds and a FM unit.

Note that, what is connected to the duplexers 112a, 112b is not limited to the two feeds 113, 114. FIG. 12B is an explanatory diagram illustrating a situation in which the duplexers 112a, 112b are connected to the two feeds 113, 114 and an FM unit 171. For example, the FM unit 171 has a function for modulating frequency of a music piece saved in the electronic device 100 to output the music piece toward the receiver (not illustrated in the drawings), and for receiving radio waves that are FM broadcasted from a base station of radio broadcast.

Figure 13:
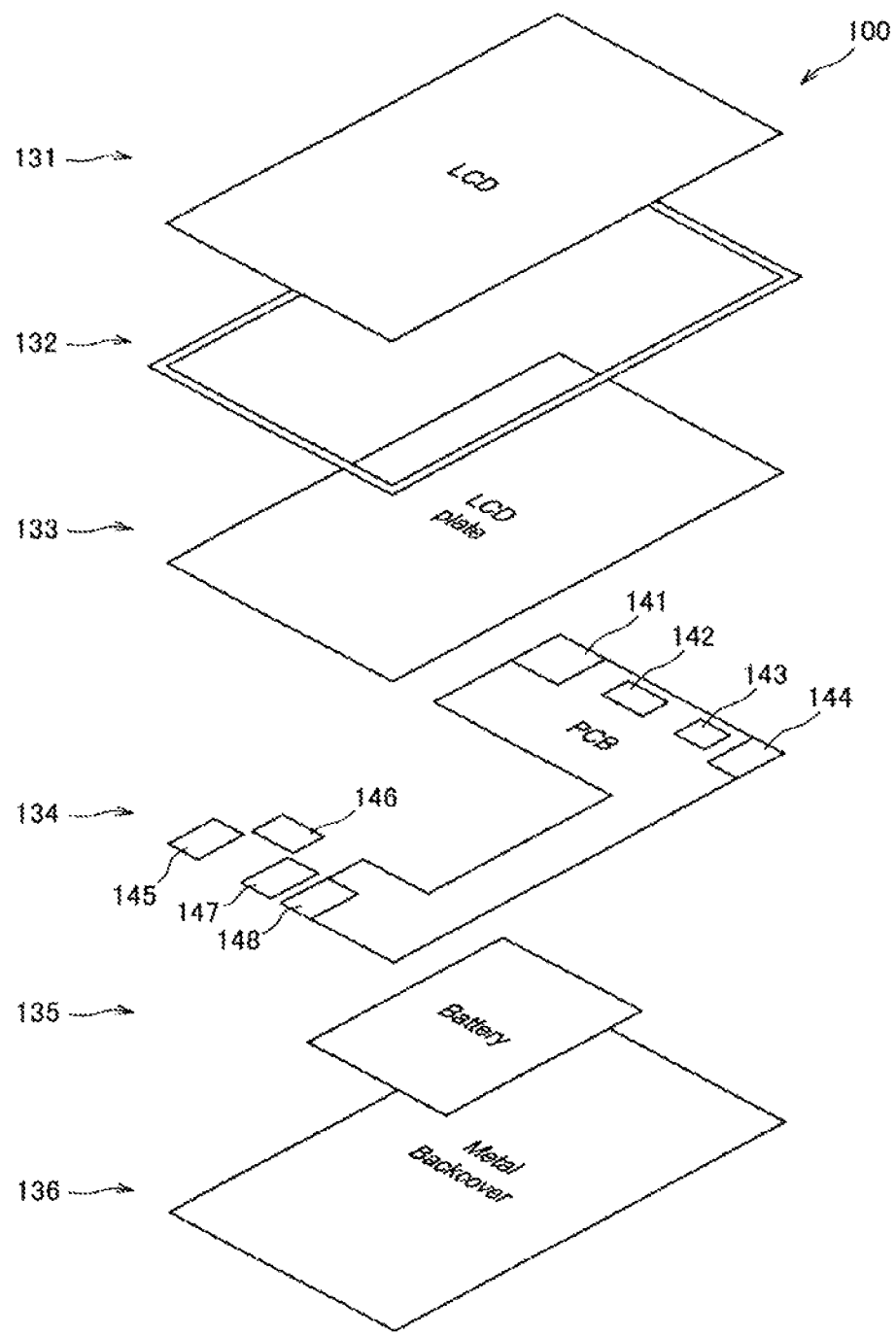
FIG. 13 is an example of an exploded perspective view of an electronic device 100.

Here, an example of an exploded perspective view of the electronic device 100 is illustrated. FIG. 13 is an explanatory diagram illustrating an example of the exploded perspective view of the electronic device 100 according to the above embodiment, and is an exploded perspective view of a commonly used smartphone.

The electronic device 100 includes a liquid crystal display (LCD) 131, a frame 132 that is formed of plastic, for example, a back surface plate 133 of the liquid crystal display, a PCB 134, a battery 135, and a backcover 136 made of metal such as aluminum. The metal backcover 136 can be formed with any thickness and in any shape, and can have a thickness equal to or smaller than 0.5 mm, for example.

The PCB 134 is provided with a rear camera 141 for capturing an image of a back surface direction of the electronic device 100 (a direction in which the metal backcover 136 is provided), an ear speaker 142 for listening to a voice of a partner at the time of telephone call, a front camera 143 for capturing an image of a front surface direction of the electronic device 100 (a direction in which the LCD 131 is provided), an audio jack 144 for inserting a plug of a headphone or the like, a vibrator 145, a speaker 146, an outside input terminal 147 such as a USB, and a microphone 148. As a matter of course, the positions of these devices are not limited to what are described in FIG. 13.

The above near-field non-contact communication antenna 103 can be provided between the LCD 131 and the back surface plate 133, for example. Note that the back surface plate 133 is not provided in the electronic device 100 in some cases, and thus the above near-field non-contact communication antenna 103 can be provided between the LCD 131 and the PCB 134, when the back surface plate 133 is not provided.

Also, at least a part of the above main antenna 101 and the sub-antenna 102 may be provided along an inner surface of the frame 132.

Next, an exemplary configuration of the electronic device 100 will be described, with a perspective view of the electronic device 100 according to the above embodiment.

Figure 14A:
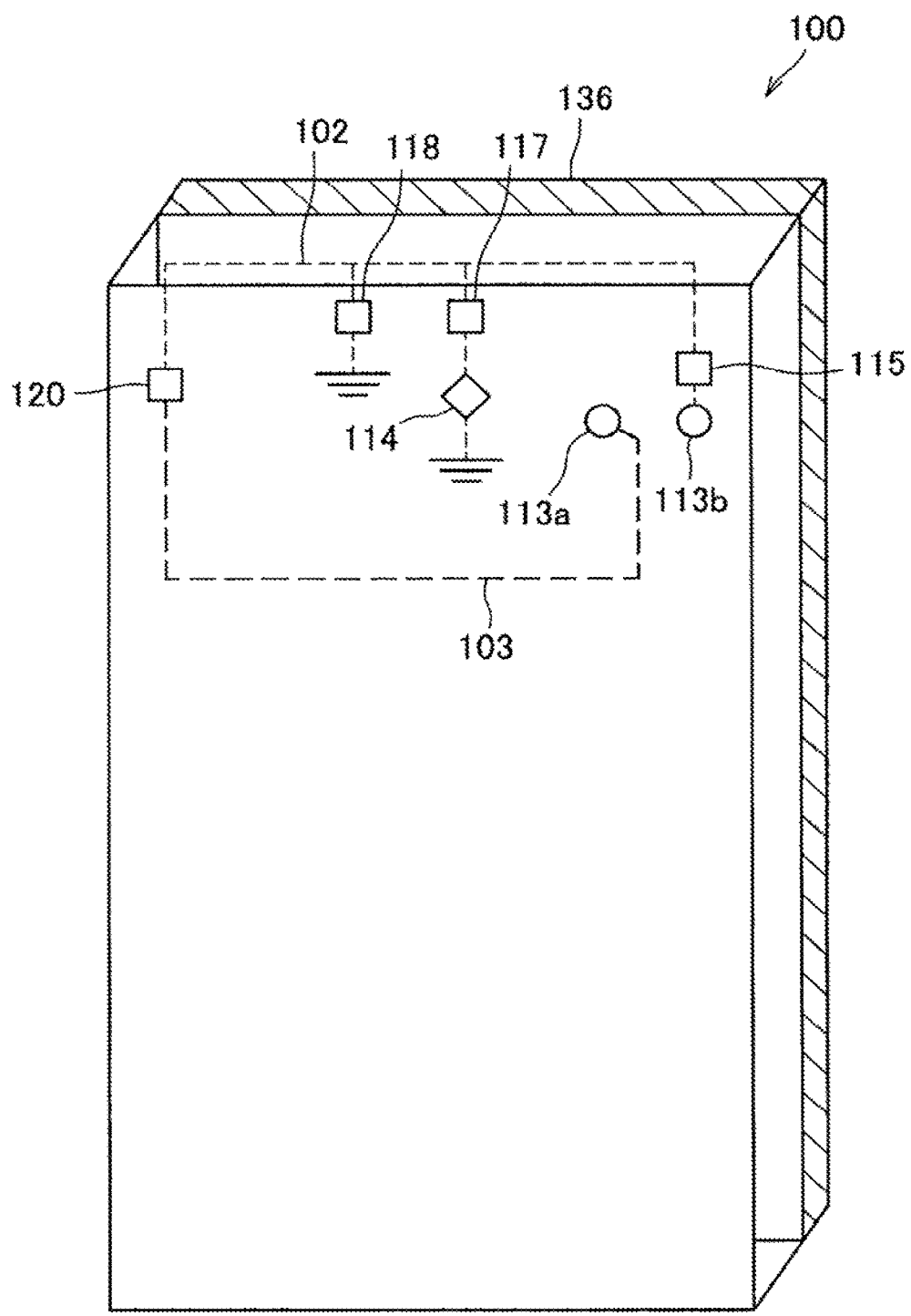
FIG. 14A is an explanatory diagram illustrated in a perspective view of an electronic device 100 according to the above embodiment, as seen from a front surface side.

FIG. 14A is an explanatory diagram illustrated in a perspective view of the electronic device 100 according to the above embodiment, as seen from the front surface side. Also, FIG. 14B is an explanatory diagram illustrated in a perspective view of the electronic device 100 according to the above embodiment, as seen from the back surface side.

FIG. 14A illustrates the sub-antenna 102, the near-field non-contact communication antenna 103, the feeds 113a, 113b, 114, and the filters 15, 117, 118, 120, among the exemplary configuration of the electronic device 100 illustrated in FIG. 6. Also, FIG. 14B illustrates the metal backcover 136 illustrated in FIG. 13.

Figure 14B:
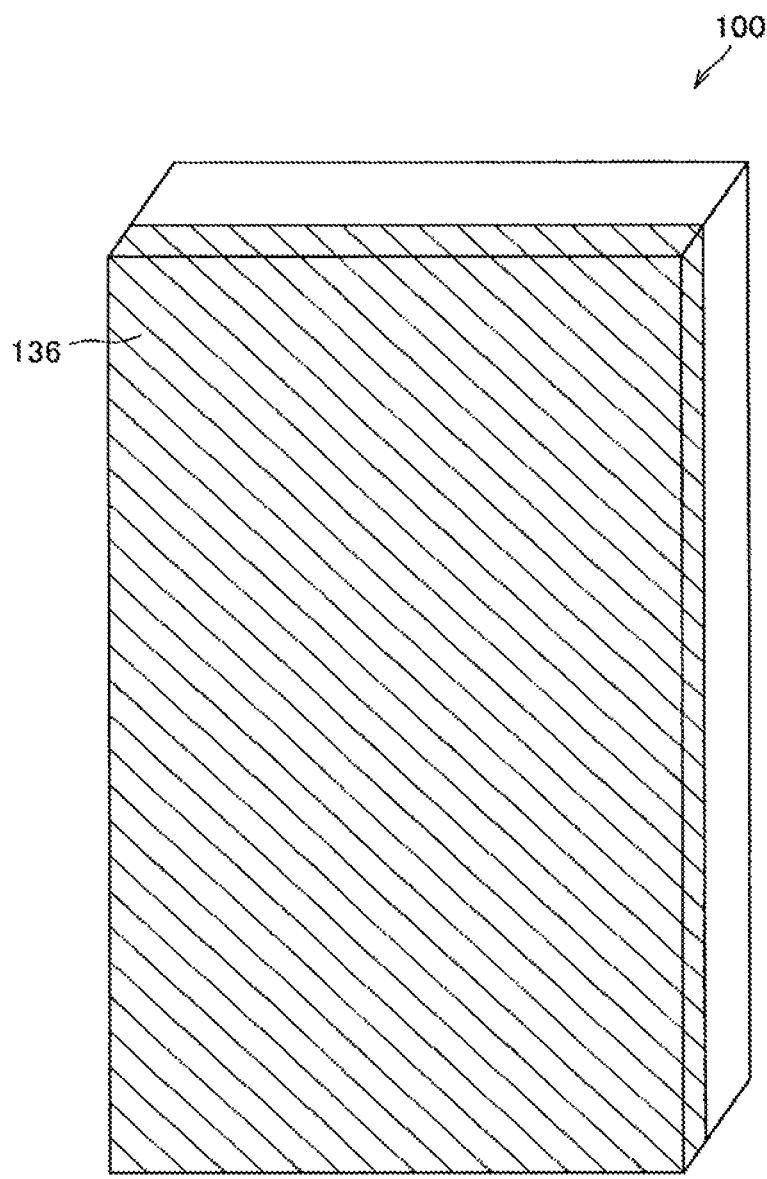
FIG. 14B is an explanatory diagram illustrated in a perspective view of an electronic device 100 according to the above embodiment, as seen from a back surface side.

Note that the exterior appearance of the electronic device 100 is not limited to what is illustrated in FIGS. 14A and 14B. For example, not only the back surface but also the side surface of the electronic device 100 may be covered with a metal cover. Also, for example, the side surface of the electronic device 100 alone may be covered with the metal cover. In this case, the back surface of the electronic device 100 may be covered with material such as plastic and glass.

Figure 15:
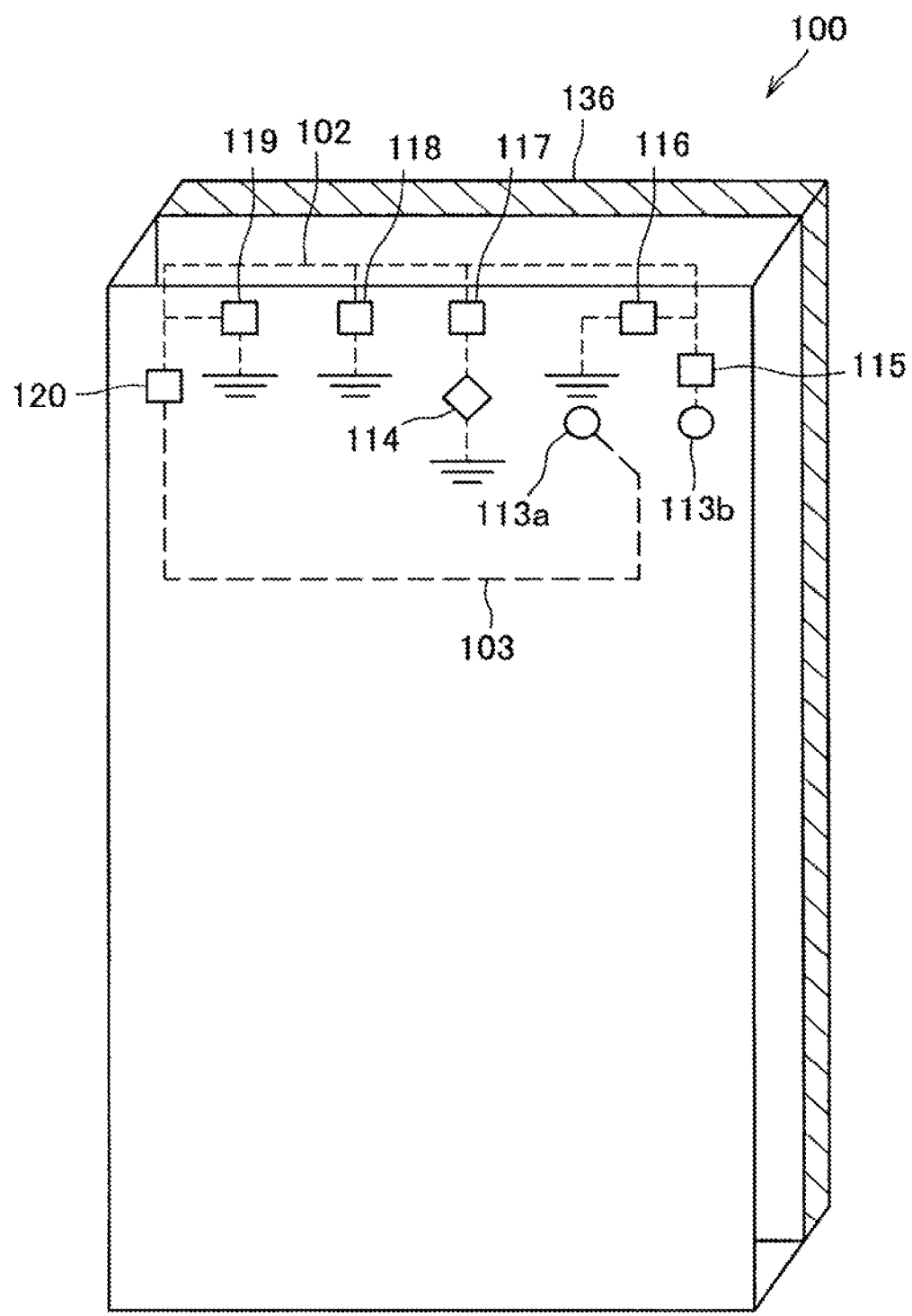
FIG. 15 is an explanatory diagram illustrated in a perspective view of another exemplary configuration of an electronic device 100 according to the above embodiment, as seen from a front surface side.

FIG. 15 is an explanatory diagram illustrated in a perspective view of another exemplary configuration of the electronic device 100 according to the above embodiment, as seen from the front surface side.

FIG. 15 illustrates the sub-antenna 102, the near-field non-contact communication antenna 103, the feeds 113a, 113b, 114, and the filters 115, 116, 117, 118, 119, 120, among the exemplary configuration of the electronic device 100 illustrated in FIG. 6.

Figure 16:
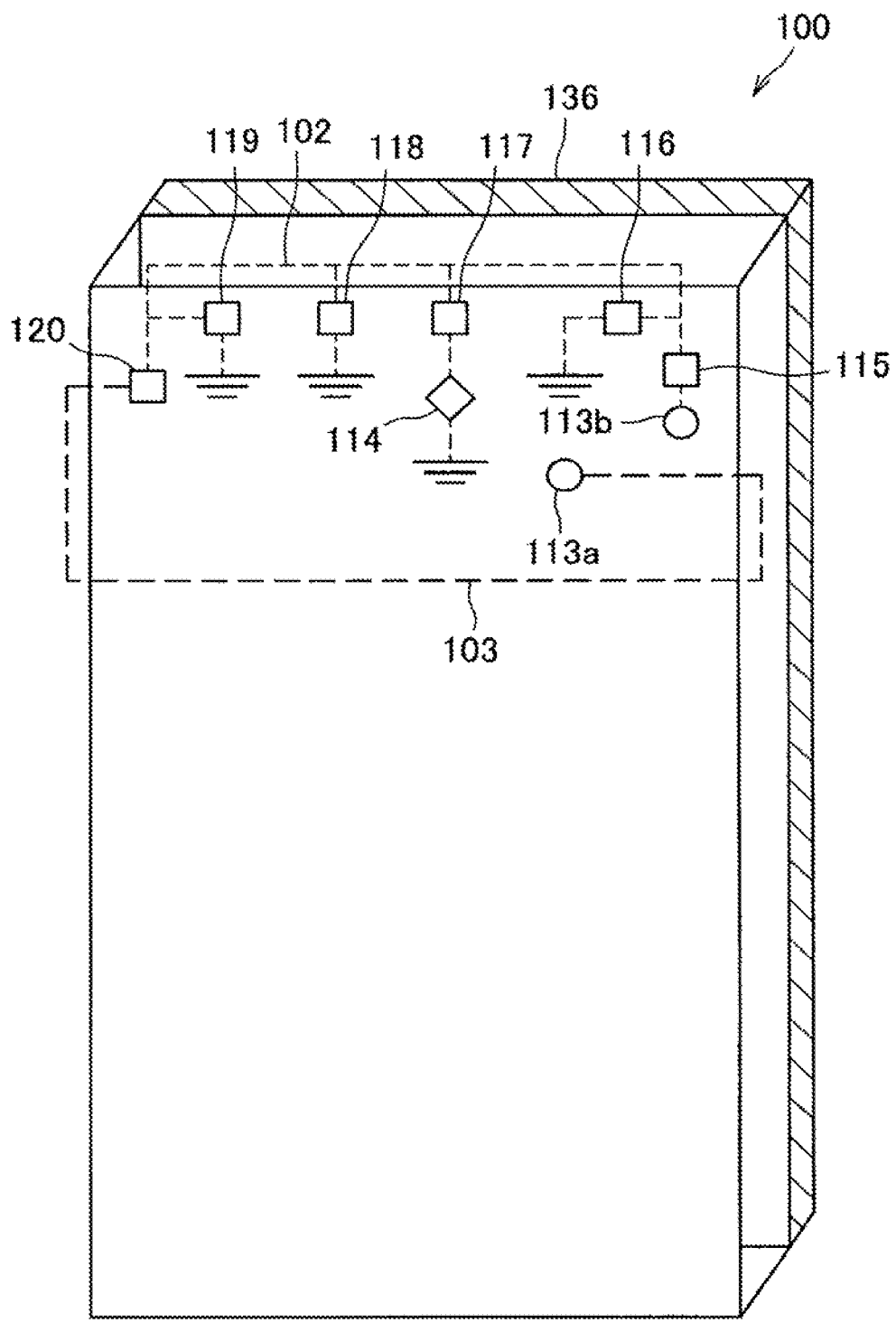
FIG. 16 is an explanatory diagram illustrated in a perspective view of another exemplary configuration of an electronic device 100 according to the above embodiment, as seen from a front surface side.

FIG. 16 is an explanatory diagram illustrated in the perspective view of another exemplary configuration of the electronic device 100 according to the above embodiment, as seen from the front surface side.

FIG. 16 illustrates the sub-antenna 102, the near-field non-contact communication antenna 103, the feeds 113a, 113b, 114, and the filters 115, 116, 117, 118, 119, 120, among the exemplary configuration of the electronic device 100 illustrated in FIG. 6.

Note that a part of the near-field non-contact communication antenna 103 illustrated in FIG. 16 is formed on the side surface of the electronic device 100, for example, an inner side of the frame 132 illustrated in FIG. 13. The whole of the near-field non-contact communication antenna 103 is needless to be formed on the back surface of the LCD 131 as described above, but a part may be formed to protrude from the LCD 131.

Figure 17:
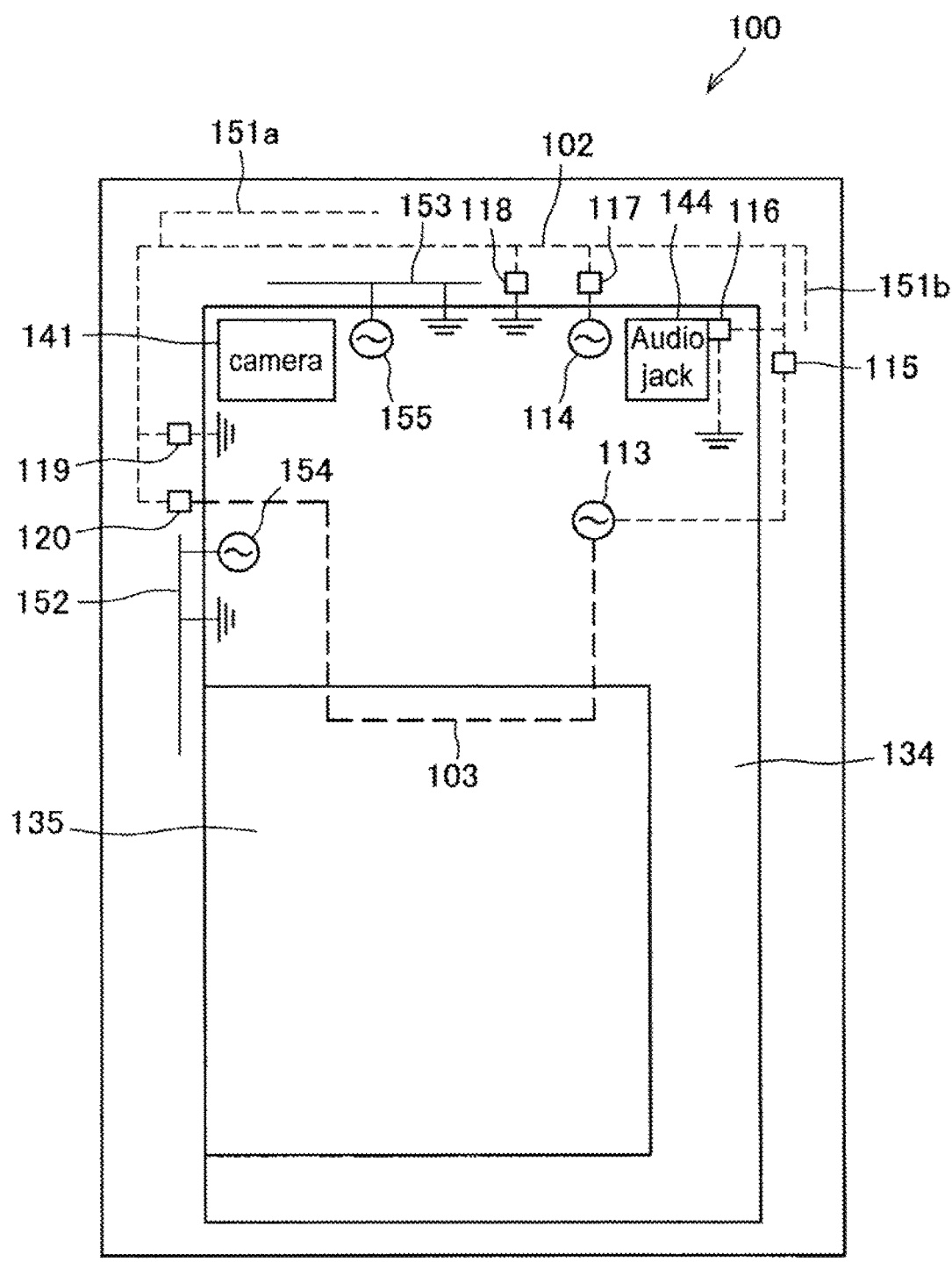
FIG. 17 is an explanatory diagram illustrating a more detailed exemplary configuration of an electronic device 100 according to the above embodiment.

FIG. 17 is an explanatory diagram illustrating a more detailed exemplary configuration of the electronic device 100 according to the above embodiment.

FIG. 17 illustrates a situation in which branches 151a, 151b are provided in the sub-antenna 102. The branches 151a, 151b added to the sub-antenna 102 are added to facilitate the adjustment of the resonance frequency at the time of the near-field non-contact communication, and the branches 151a, 151b are not to be provided necessarily. Also, FIG. 17 illustrates a situation in which a wireless LAN antenna 152 and a GPS antenna 153 are provided in the electronic device 100. Note that the sub-antenna 102 illustrated in FIG. 17 can operate as a cellular communication main antenna.

Next, the communication characteristics of the electronic device 100 according to the above embodiment will be described.

Figure 18:
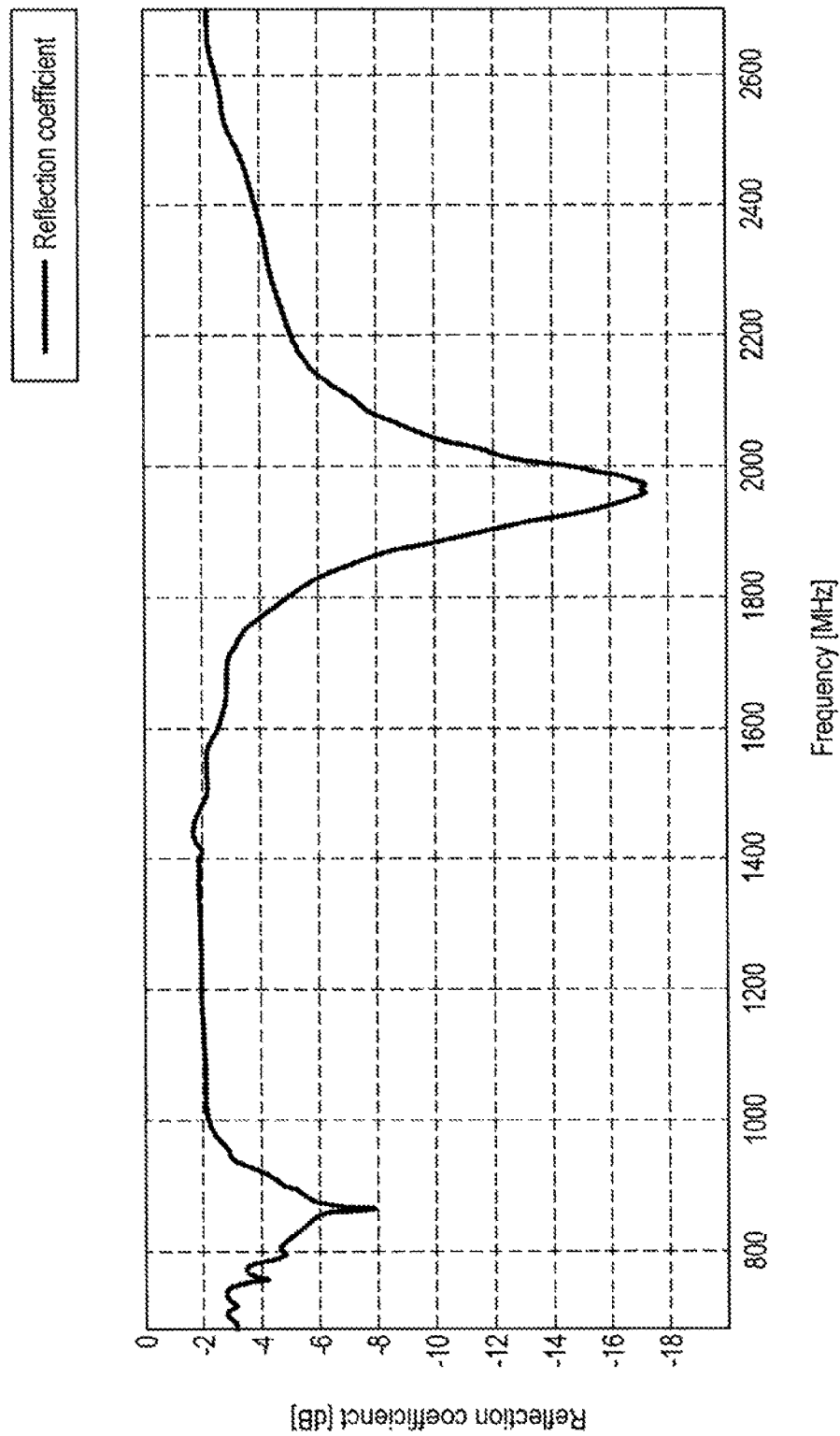
FIG. 18 is an explanatory diagram that illustrates a graph of an example of a reflection coefficient of a sub-antenna.

FIG. 18 is an explanatory diagram that illustrates a graph of reflection coefficient of the sub-antenna 102 of the electronic device 100. The horizontal axis of the graph illustrated in FIG. 18 represents frequency (MHz), and illustrates a range of about 700 MHz to 2700 MHz in the graph of FIG. 18. Also, the vertical axis of the graph illustrated in FIG. 18 represents reflection coefficient within a range of 0 dB to −20 dB. In the graph illustrated in FIG. 18, the reflection coefficient drops near 880 MHz and near 1960 MHz.

Figure 19:
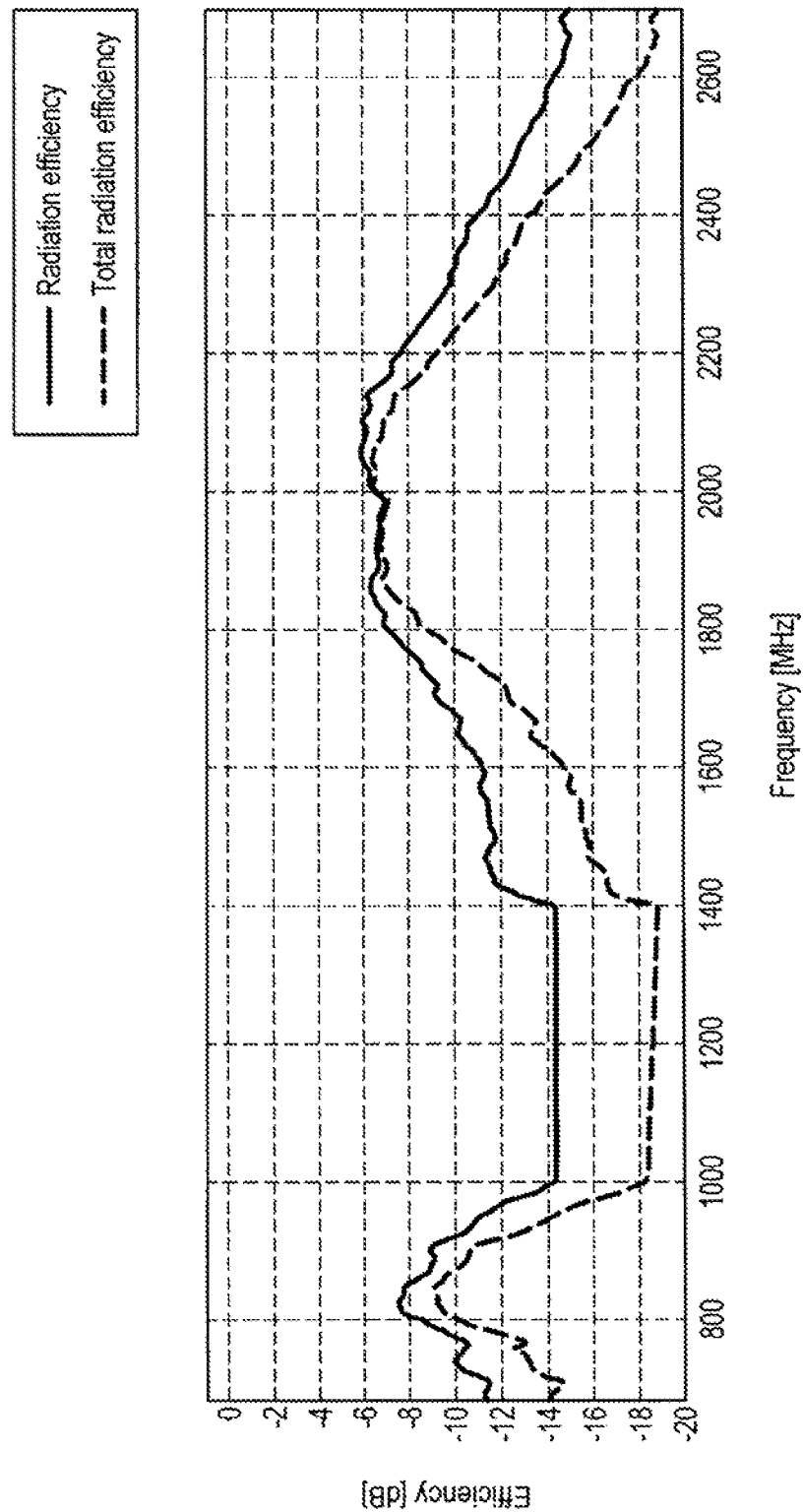
FIG. 19 is an explanatory diagram that illustrates a graph of an example of antenna efficiency of a sub-antenna.

FIG. 19 is an explanatory diagram that illustrates a graph of the antenna efficiency of the sub-antenna 102. The horizontal axis of the graph illustrated in FIG. 19 represents frequency (MHz), and illustrates a range of about 700 MHz to 2700 MHz in the graph of FIG. 19. Also, the vertical axis of the graph illustrated in FIG. 19 represents the antenna efficiency within a range of 0 dB to −20 dB. Also, the solid line of the graph of FIG. 19 illustrates an example of an ideal radiation efficiency without the mismatch loss, and the dashed line illustrates an example of an actual radiation efficiency when the sub-antenna 102 and the near-field non-contact communication antenna 103 are combined.

In the graph of the reflection coefficient illustrated in FIG. 18, the reflection coefficient drops near 880 MHz and near 1960 MHz, and thus in the graph of the antenna efficiency illustrated in FIG. 19, the solid line and the dashed line get close to each other near 880 MHz and near 1960 MHz.

Thus, the electronic device 100 according to the above embodiment can achieve both of the near-field non-contact communication and the cellular communication, by combining the near-field non-contact communication antenna 103 with the sub-antenna 102.

FIGS. 20 to 27 are explanatory diagrams that illustrate graphs of examples of the characteristics of the near-field non-contact communication of the electronic device 100 according to the above embodiment.

Figure 20:
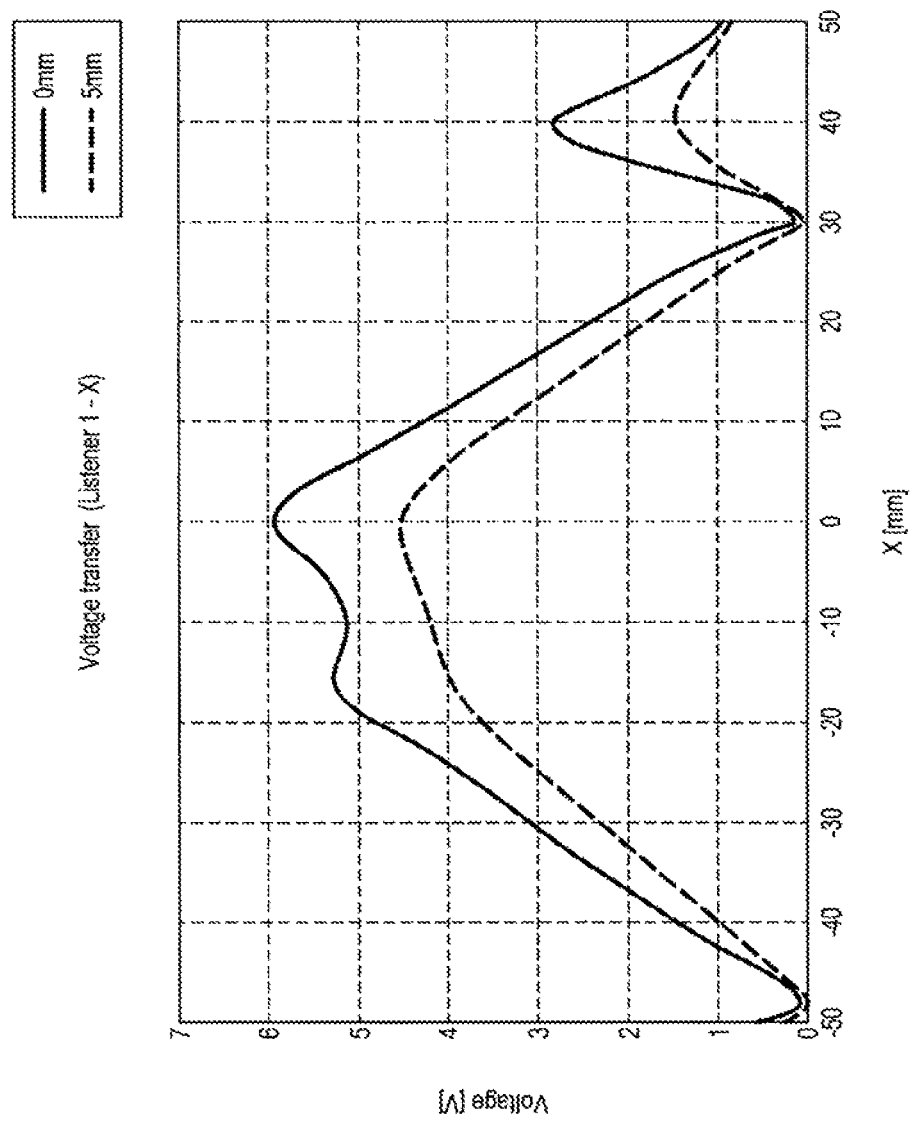
FIG. 20 is an explanatory diagram that illustrates a graph of an example of characteristics of near-field non-contact communication of an electronic device 100 according to the above embodiment.
Figure 21:
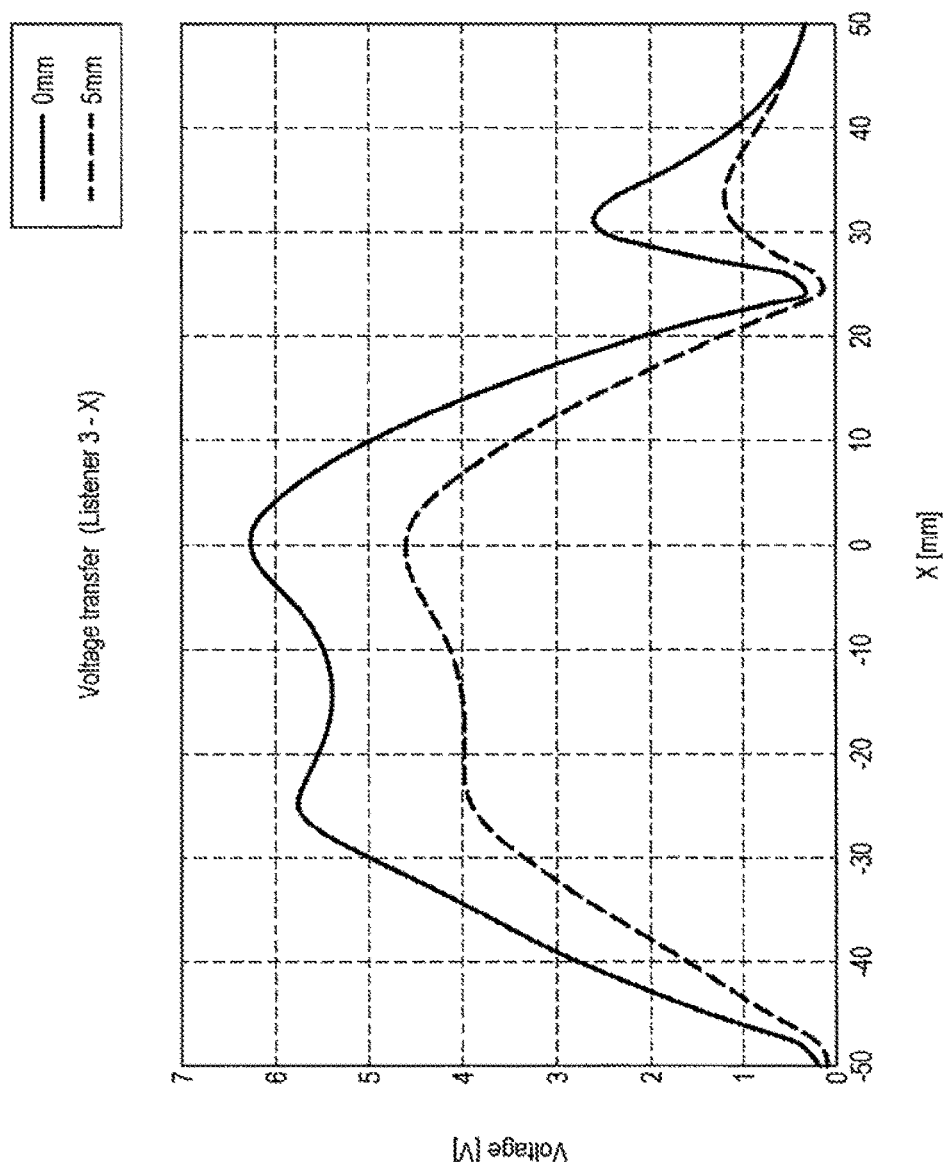
FIG. 21 is an explanatory diagram that illustrates a graph of an example of characteristics of near-field non-contact communication of an electronic device 100 according to the above embodiment.
Figure 22:
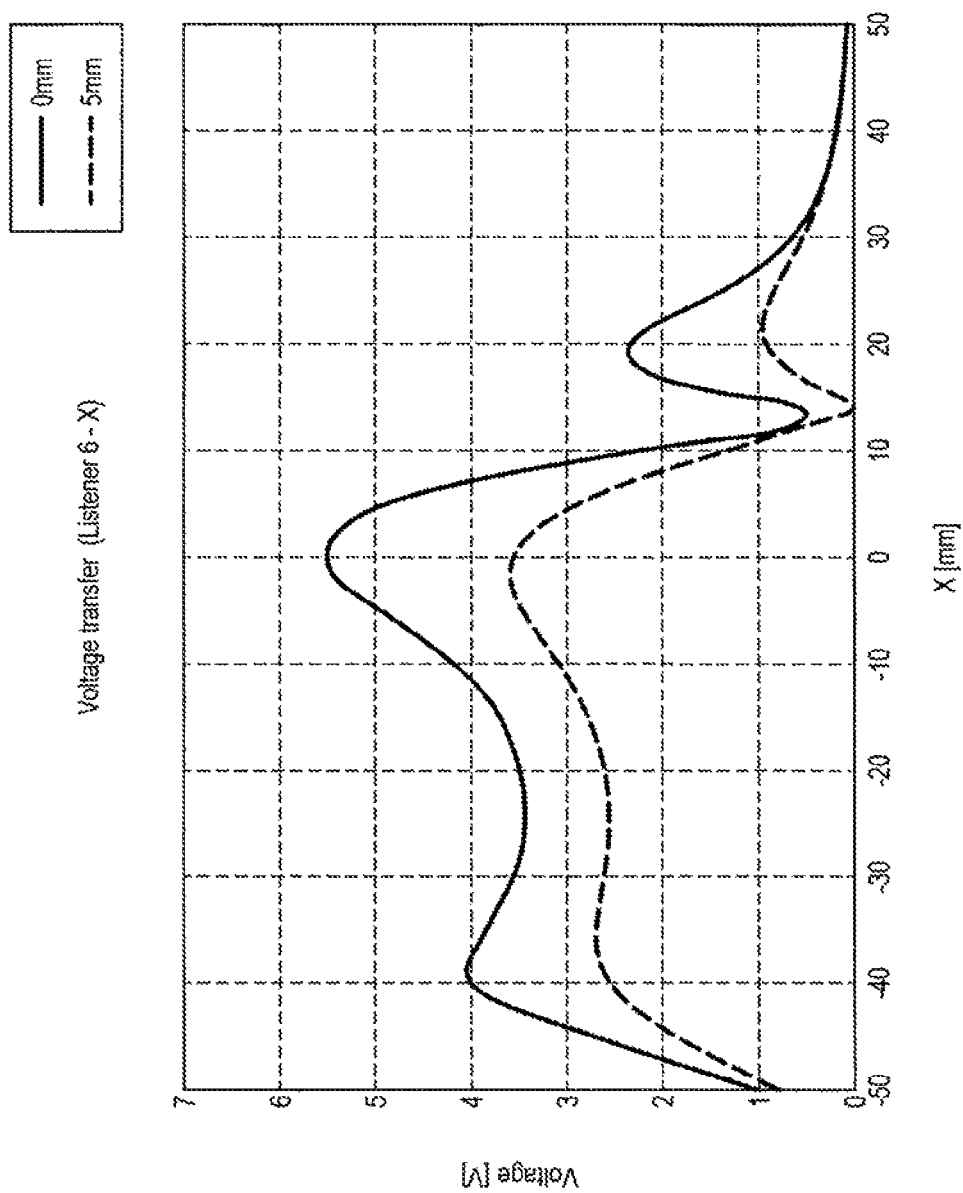
FIG. 22 is an explanatory diagram that illustrates a graph of an example of characteristics of near-field non-contact communication of an electronic device 100 according to the above embodiment.

FIGS. 20, 21, 22 are explanatory diagrams illustrating examples of the voltage supply characteristics of the electronic device 100 in X axis direction, in relation to the reader/writers of Listener-1, Listener-3, and Listener-6, respectively.

The horizontal axis of each graph illustrated in FIGS. 20, 21, 22 represents the distance in millimeters in the X axis direction between the reader/writer and the center of the loop antenna formed by the sub-antenna 102 and the near-field non-contact communication antenna 103, with respect to the origin at the center of the loop antenna formed by the sub-antenna 102 and the near-field non-contact communication antenna 103. Also, the vertical axis of each graph illustrated in FIGS. 20, 21, 22 represents the value of the voltage, in V, that is supplied from the electronic device 100 to the reader/writers of Listener-1, Listener-3, and Listener-6 respectively.

Note that the position of the center of the loop antenna formed by the sub-antenna 102 and the near-field non-contact communication antenna 103 can be the position that is moved in the direction of a side provided with the sub-antenna 102 by a predetermined distance from the center of the electronic device 100, for example.

The solid lines of the graphs illustrated in FIGS. 20, 21, 22 are the voltage supply characteristics when the distance in the Z axis direction between the electronic device 100 and the reader/writer is 0 mm, and the dashed lines are the voltage supply characteristics when the distance in the Z axis direction between the electronic device 100 and the reader/writer is 5 mm.

As described above, the voltage supply characteristic by the loop antenna formed by the sub-antenna 102 and the near-field non-contact communication antenna 103 is high near 0 mm. Thus, the voltage supply characteristic by the loop antenna formed by the sub-antenna 102 and the near-field non-contact communication antenna 103 satisfies a request with regard to the X axis direction, in the near-field non-contact communication.

Figure 23:
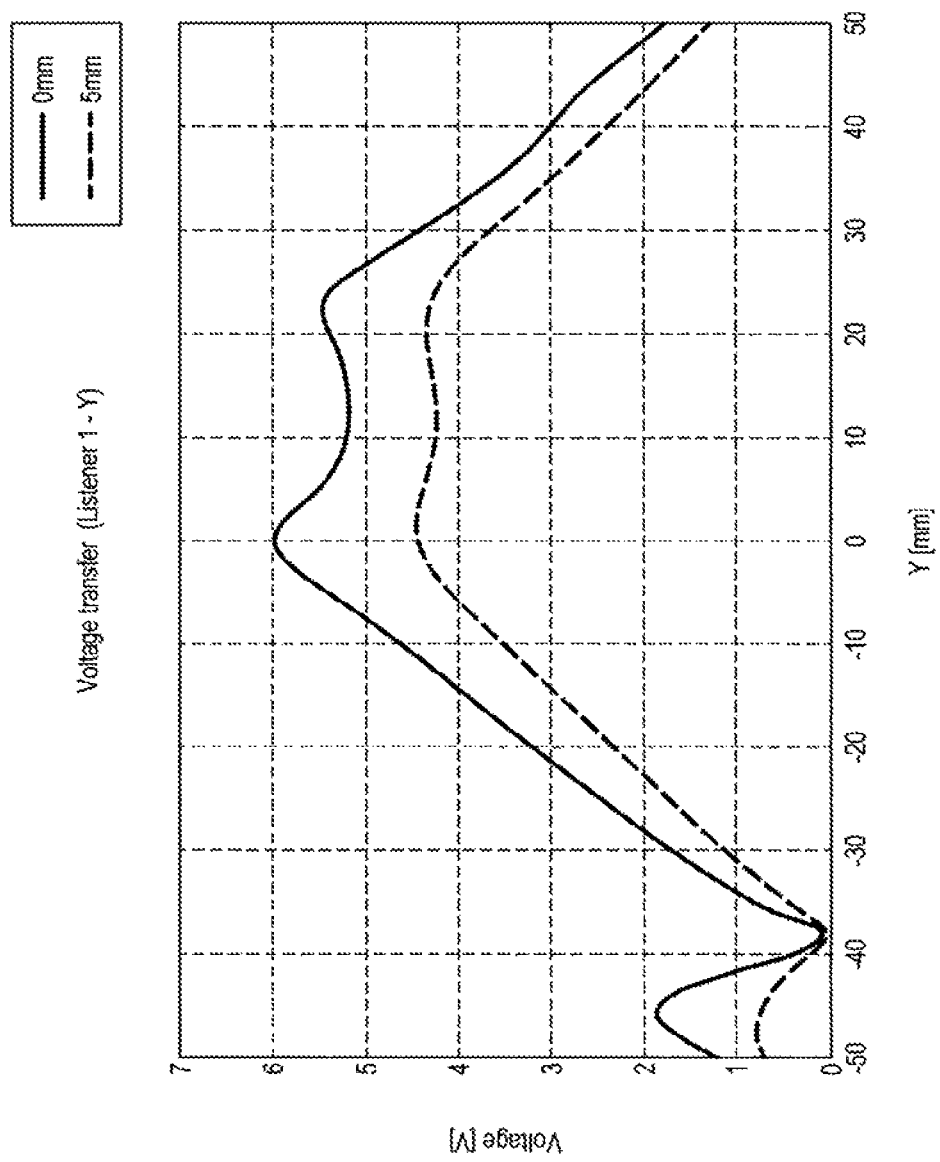
FIG. 23 is an explanatory diagram that illustrates a graph of an example of characteristics of near-field non-contact communication of an electronic device 100 according to the above embodiment.
Figure 24:
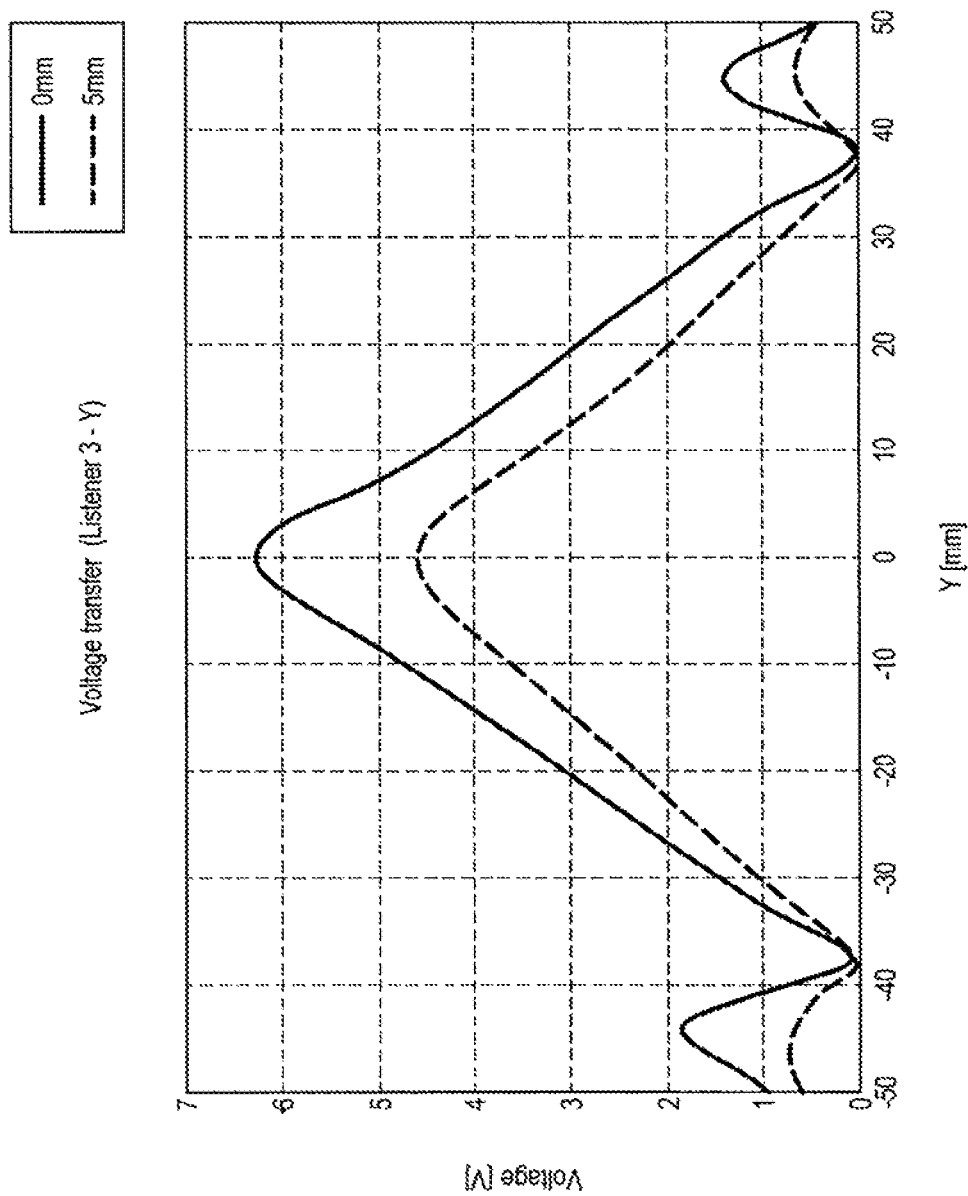
FIG. 24 is an explanatory diagram that illustrates a graph of an example of characteristics of near-field non-contact communication of an electronic device 100 according to the above embodiment.
Figure 25:
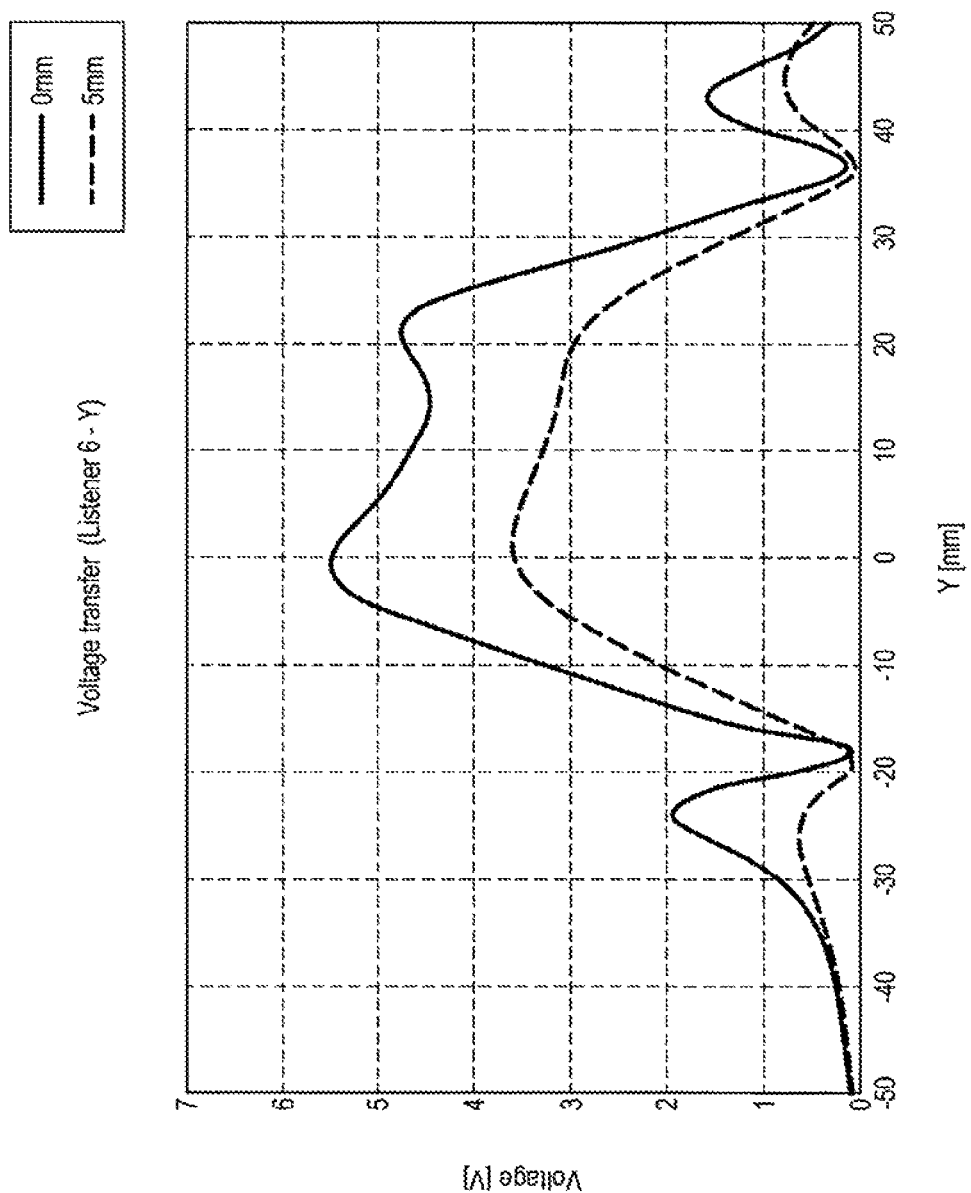
FIG. 25 is an explanatory diagram that illustrates a graph of an example of characteristics of near-field non-contact communication of an electronic device 100 according to the above embodiment.

FIG. 23, 24, 25 are explanatory diagrams illustrating examples of the voltage supply characteristics of the electronic device 100 in the Y axis direction, in relation to the reader/writers of Listener-1, Listener-3, and Listener-6, respectively.

The horizontal axis of each graph illustrated in FIG. 23, 24, 25 represents the distance in millimeters in the Y axis direction, between the reader/writer and the center of the loop antenna formed by the sub-antenna 102 and the near-field non-contact communication antenna 103, with respect to the origin at the center of the loop antenna formed by the sub-antenna 102 and the near-field non-contact communication antenna 103. Also, the vertical axis of each graph illustrated in FIG. 23, 24, 25 represents the value of the voltage, in V, that is supplied from the electronic device 100 to Listener-1, Listener-3, and Listener-6 respectively.

The solid lines of the graphs illustrated in FIG. 23, 24, 25 are the voltage supply characteristics when the distance in the Z axis direction between the electronic device 100 and the reader/writer is 0 mm, and the dashed lines are the voltage supply characteristics when the distance in the Z axis direction between the electronic device 100 and the reader/writer is 5 mm.

As described above, the voltage supply characteristic by the loop antenna formed by the sub-antenna 102 and the near-field non-contact communication antenna 103 is high near 0 mm. Thus, the voltage supply characteristic by the loop antenna formed by the sub-antenna 102 and the near-field non-contact communication antenna 103 satisfies the request with regard to the Y axis direction in the near-field non-contact communication.

Figure 26:
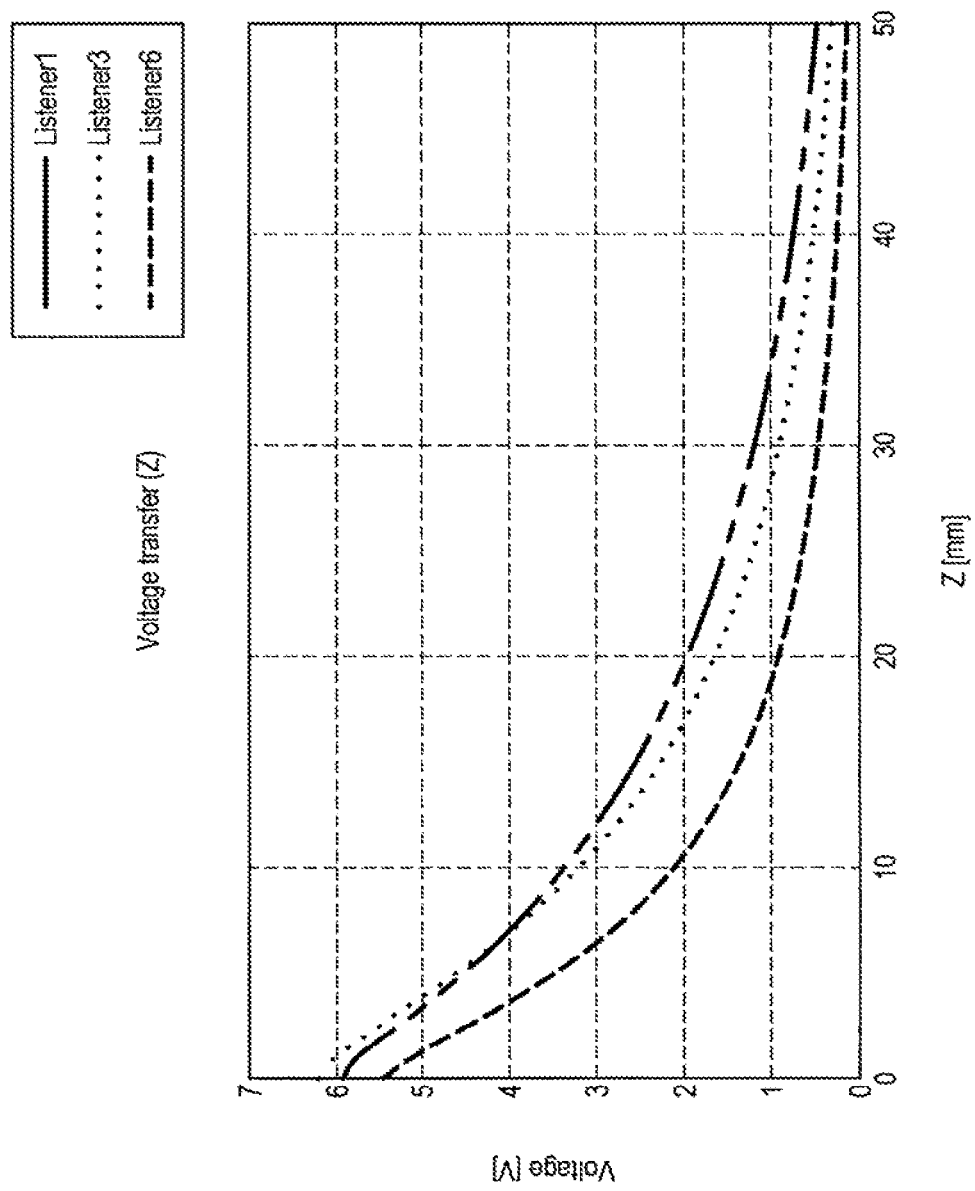
FIG. 26 is an explanatory diagram that illustrates a graph of an example of characteristics of near-field non-contact communication of an electronic device 100 according to the above embodiment.

FIG. 26 is an explanatory diagram illustrating an example of the voltage supply characteristics of the electronic device 100 in the Z axis direction, in the case of Listener-1, Listener-3, and Listener-6.

The horizontal axis of the graph illustrated in FIG. 26 represents the distance in millimeters in the Z axis direction between the reader/writer and the center of the loop antenna formed by the sub-antenna 102 and the near-field non-contact communication antenna 103, with respect to the origin at the center of the loop antenna formed by the sub-antenna 102 and the near-field non-contact communication antenna 103. Also, the vertical axis of the graph illustrated in FIG. 26 represents the value of the voltage, in V, that is supplied from the electronic device 100 to Listener-1.

Figure 27:
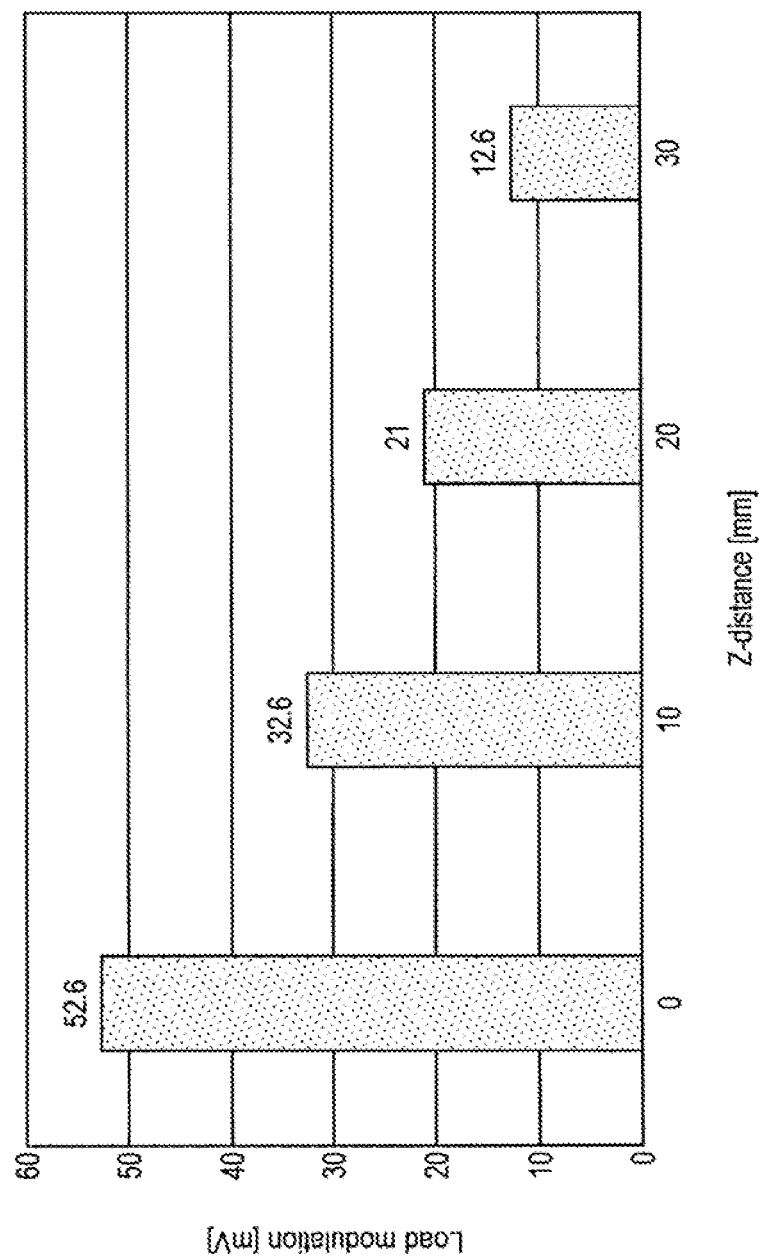
FIG. 27 is an explanatory diagram that illustrates a graph of an example of characteristics of near-field non-contact communication of an electronic device 100 according to the above embodiment.

FIG. 27 is an explanatory diagram that illustrates a bar graph of an example of the characteristics of the loop antenna formed by the sub-antenna 102 and the near-field non-contact communication antenna 103, of the electronic device 100. The horizontal axis represents the communication distance in millimeters in the Z axis direction between the center of the horizontal axis of the reader/writer and the center of the loop antenna formed by the sub-antenna 102 and the near-field non-contact communication antenna 103, and the vertical axis represents the load modulation level in mV.

As described above, the voltage supply characteristic by the loop antenna formed by the sub-antenna 102 and the near-field non-contact communication antenna 103 is high near 0 mm. Thus, the voltage supply characteristic by the loop antenna formed by the sub-antenna 102 and the near-field non-contact communication antenna 103 also satisfies the request with regard to the Z axis direction in the near-field non-contact communication.

As described above, the electronic device 100 according to the above embodiment is capable of the near-field non-contact communication that satisfies the request, even if the loop antenna is configured with the sub-antenna 102 and the near-field non-contact communication antenna 103.

Next, the exemplary variant of the electronic device 100 according to the above embodiment will be described.

The electronic device 100 according to the above embodiment includes the metal backcover 136 on the back surface, but a slit can be formed in the metal backcover 136 in order to improve the characteristics of the near-field non-contact communication when the back surface side of the electronic device 100 is brought close to the reader/writer.

Figure 28:
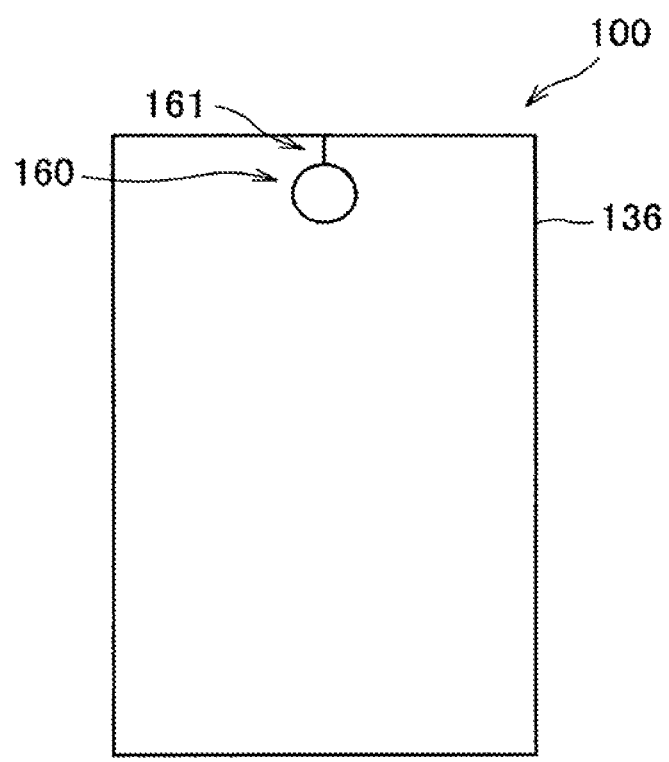
FIG. 28 is an explanatory diagram illustrating an exemplary configuration of a backcover 136 of an electronic device 100 according to the above embodiment.
Figure 29:
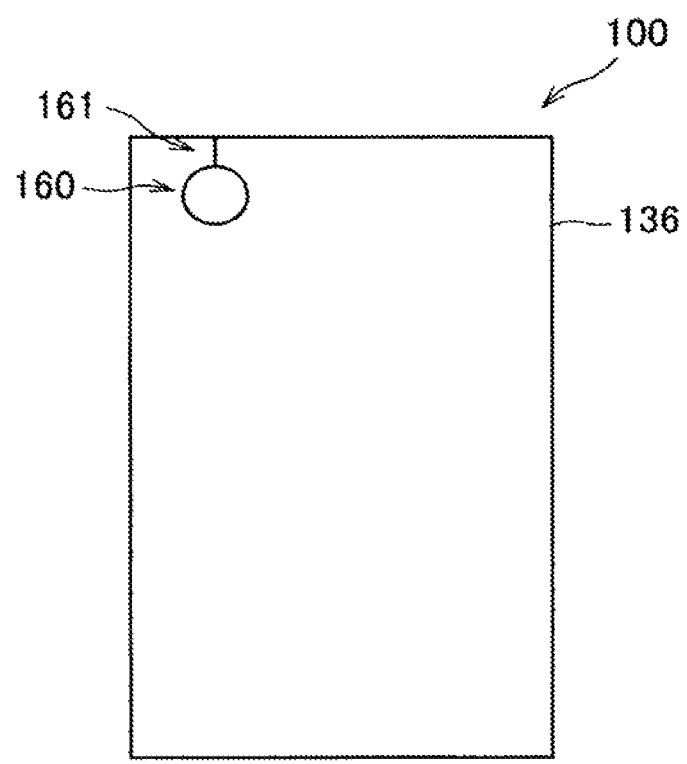
FIG. 29 is an explanatory diagram illustrating an exemplary configuration of a backcover 136 of an electronic device 100 according to the above embodiment.

FIGS. 28 and 29 are explanatory diagrams illustrating exemplary configurations of the backcover 136 of the electronic device 100 according to the above embodiment. FIGS. 28 and 29 illustrate examples of the backcover 136 in which a slit is formed.

FIG. 28 illustrates a case in which a slit 161 is provided between a camera hole 160 that is provided at the upper portion of the center of the backcover 136 and the upper end of the backcover 136, that is, the side corresponding to the position at which the sub-antenna 102 is provided. Also, FIG. 29 illustrates a case in which the slit 161 is provided between the camera hole 160 that is provided at the upper portion of the left end of the backcover 136 and the upper end of the backcover 136, that is, the side corresponding to the position at which the sub-antenna 102 is provided.

The characteristics of the near-field non-contact communication when the back surface side is brought close to the reader/writer can be improved, by forming the slit 161 in the side corresponding to the position at which the sub-antenna 102 is provided in the metal backcover 136 as described above, which is described below.

Figure 30:
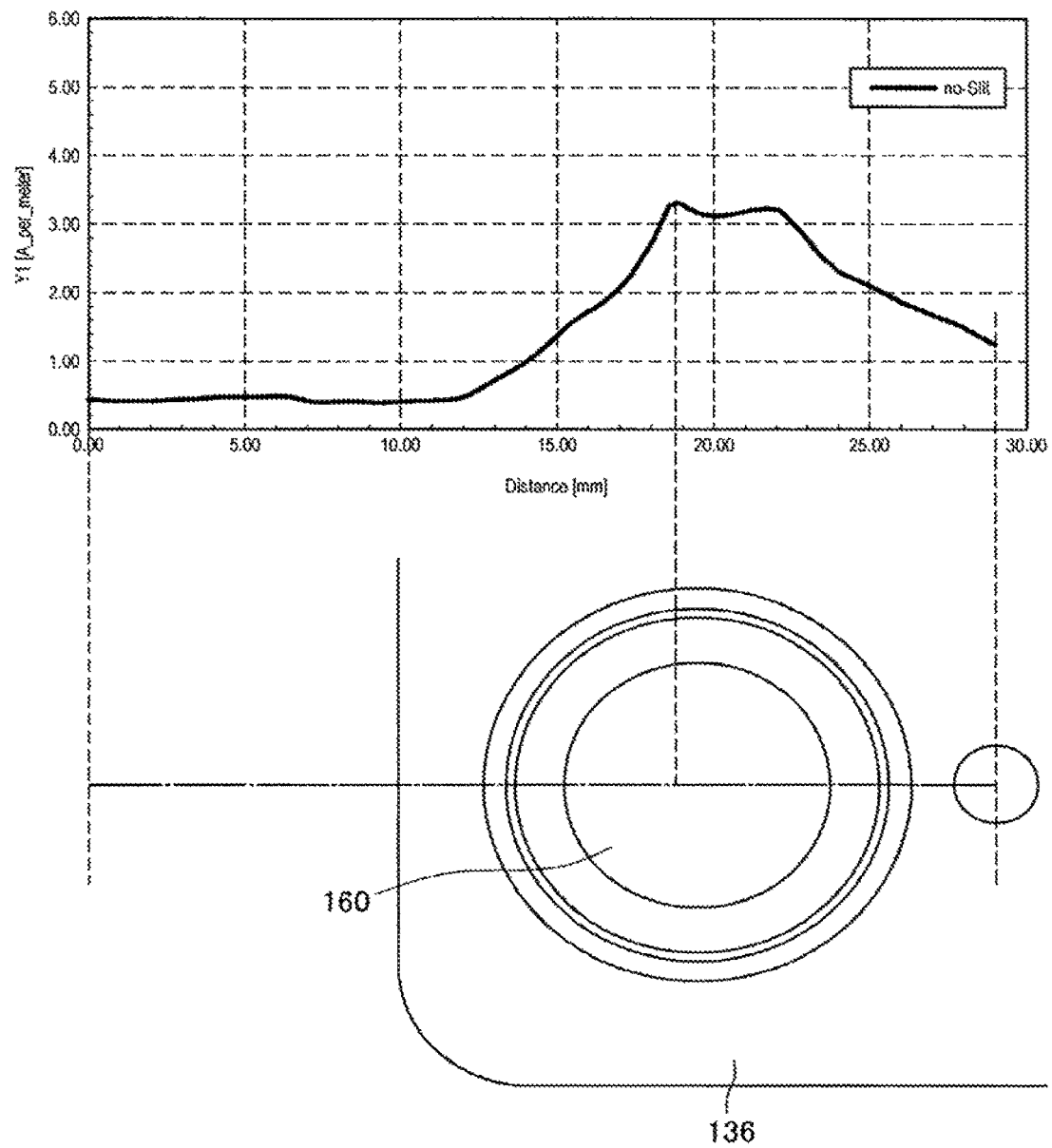
FIG. 30 is an explanatory diagram illustrating an example of a magnetic field strength around a camera hole 160.

FIG. 30 is an explanatory diagram illustrating an example of the magnetic field strength around the camera hole 160, when the camera hole 160 is provided at the upper portion of the left end of the backcover 136 as in FIG. 29, but the slit 161 is not provided. Also, FIG. 31 is an explanatory diagram illustrating an example of the magnetic field strength around the camera hole 160, when the camera hole 160 is provided at the upper portion of the left end of the backcover 136 as in FIG. 29, and the slit 161 is provided as well.

Figure 31:
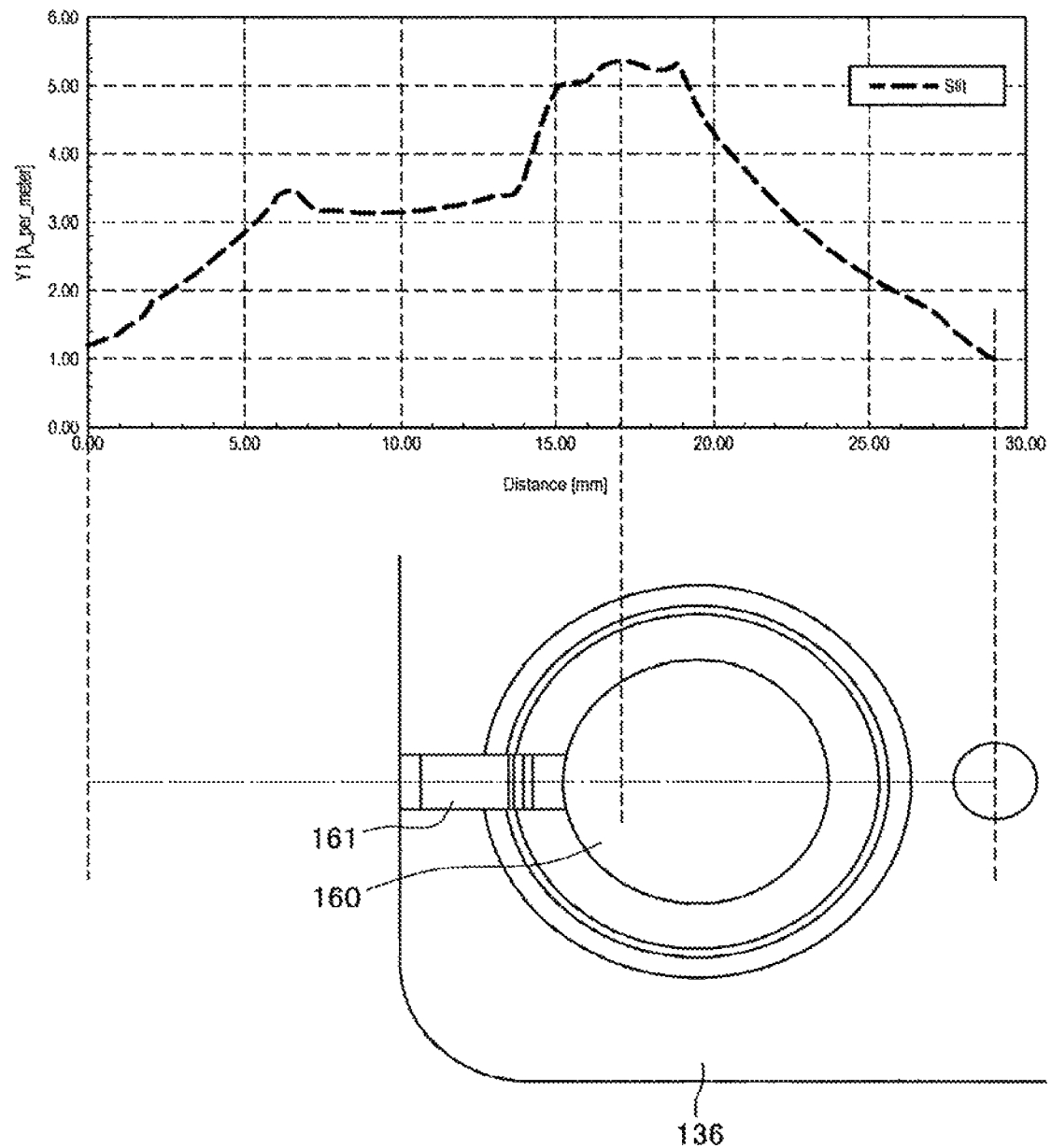
FIG. 31 is an explanatory diagram illustrating an example of a magnetic field strength around a camera hole 160.

Both of FIGS. 30 and 31 illustrate graphs at the upper sides and structures of the backcover 136 at the lower sides. Also, the horizontal axes in the graph of the upper side of FIGS. 30 and 31 correspond to the positions of the backcover 136 illustrated in the lower sides of the respective drawings, and the vertical axis represents the intensity of the magnetic field in A/m.

Figure 32:
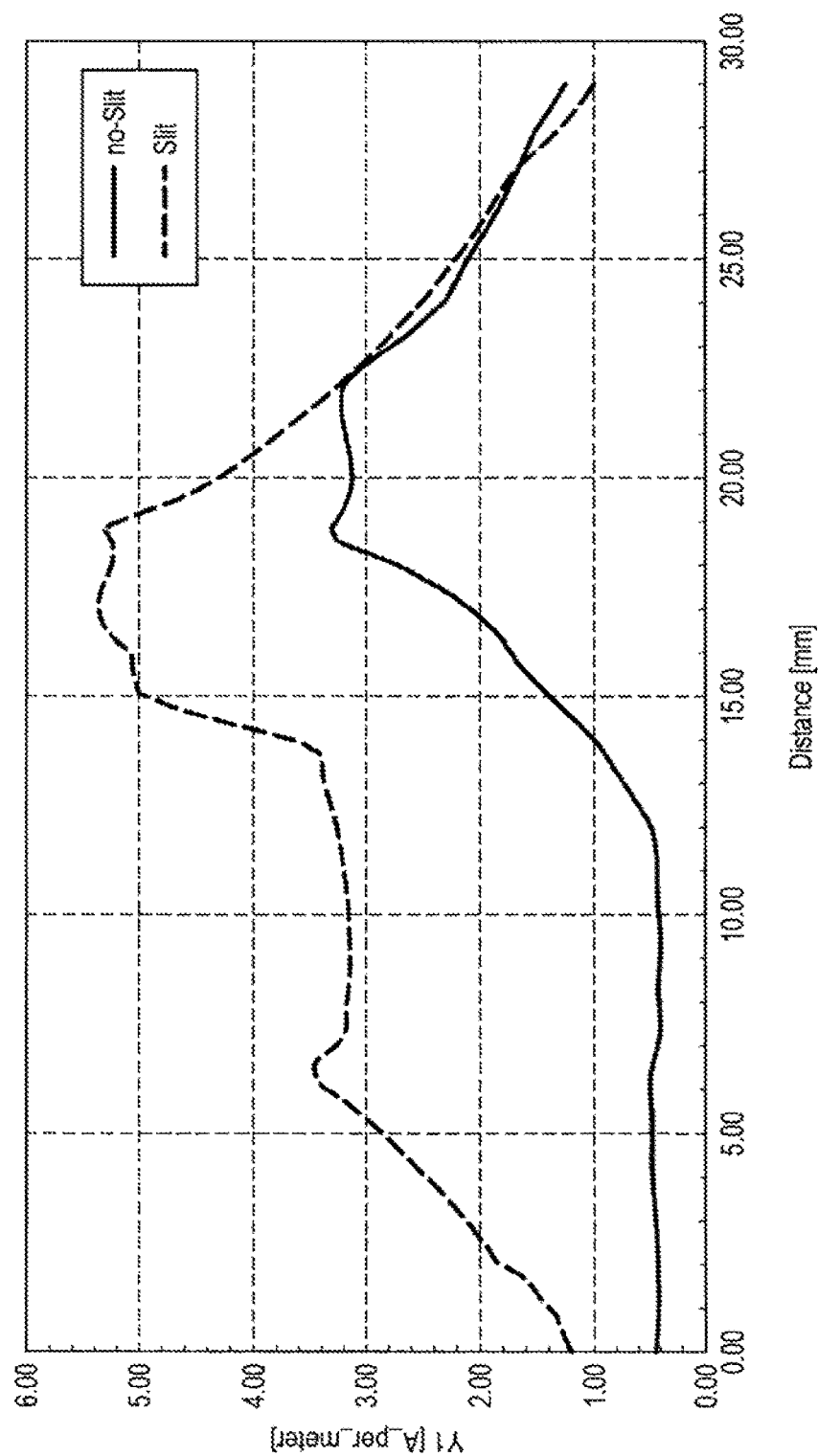
FIG. 32 is an explanatory diagram illustrating an example of a magnetic field strength around a camera hole 160.

FIG. 32 is an explanatory diagram illustrating superimposed graph parts illustrated in FIGS. 30 and 31. It is known that the overall magnetic field is generated intensely when the slit 161 is provided, as compared with a case in which the slit 161 is not provided, as illustrated in FIG. 32. The magnetic field being generated intensely can improve the communication characteristics at the time of the near-field non-contact communication from the electronic device 100 to the reader/writer.

Thus, the slit 161 formed in the metal backcover 136 as illustrated in FIGS. 28 and 29 brings the effect of improving the communication characteristics when the back surface side of the electronic device 100 is brought close to the reader/writer to perform the near-field non-contact communication.

2. Conclusion

As described above, according to the embodiment of the present disclosure, the electronic device 100 that includes the sub-antenna 102 for performing the cellular communication and the near-field non-contact communication antenna 103 that configures the loop antenna integrally with the sub-antenna 102 is provided. Then, the filter that blocks the signal of the near-field non-contact communication is connected to the sub-antenna 102.

The electronic device 100 according to the above embodiment has such a configuration to allow the antenna for performing the near-field non-contact communication with the reader/writer and the antenna for performing the wireless communication with the base station or the like to coexist effectively.

Also, the electronic device 100 according to the embodiment includes such a configuration to attach the mark used when the user puts the display surface on the reader/writer to perform the near-field non-contact communication, to the region other than the display region of the display.

The technology in the above embodiment relates to the technology that the present case discloser has already disclosed in U.S. application Ser. No. 14/738,689 filed in the United States of America. The technology that is disclosed in the application is the same as the technology in the above embodiment in forming the loop through the filter. On the other hand, the technology in the above embodiment differs in the components that form the loop, from the technology that is disclosed in the application.

It should be understood by those skilled in the art that various modifications, combinations, sub-combinations and alterations may occur depending on design requirements and other factors insofar as they are within the scope of the appended claims or the equivalents thereof.

For example, in the above embodiment, a case that includes the metal backcover 136 on the back surface of the electronic device 100 has been described, but the present technology is not limited to this example. For example, the above configuration for sharing the sub-antenna 102 and the near-field non-contact communication antenna 103 may also be used in the electronic device including a cover at the back surface which is made of plastic or glass. Also, for example, the above configuration for sharing the sub-antenna 102 and the near-field non-contact communication antenna 103 may be used in the electronic device including the front surface covered with plastic or glass overall.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An electronic device including:
a first antenna for wireless communication;
a second antenna for near-field communication that forms a loop by being used together with the first antenna, at least a part of the second antenna being positioned at a back surface of a display region of a display; and a first filter that is provided in the first antenna or the second antenna, passes a signal of a frequency band used in the near-field communication to the first antenna, and blocks inflow of the signal of the frequency band used in the wireless communication into the second antenna.

(2) The electronic device according to (1), further including:
at least one communication characteristic adjustment unit that is connected to the first antenna and adjusts a characteristic of the wireless communication.

(3) The electronic device according to (2), wherein
the communication characteristic adjustment unit includes a second filter that passes the signal of the frequency band used in the wireless communication.

(4) The electronic device according to (2), wherein
the communication characteristic adjustment unit includes a matching circuit.

(5) The electronic device according to any of (1) to (4), wherein
the near-field communication is near-field non-contact communication or near-field non-contact charging.

(6) The electronic device according to (5), wherein
a first antenna feed for the near-field non-contact communication or the near-field non-contact charging is connected to the second antenna.

(7) The electronic device according to (5), wherein
the second antenna is shared in the near-field non-contact communication and the near-field non-contact charging.

(8) The electronic device according to (7), wherein
a first antenna feed for the near-field non-contact communication and a second antenna feed for the near-field non-contact charging are connected to the second antenna.

(9) The electronic device according to any of (1) to (8), wherein
the second antenna is turned at least locally.

(10) The electronic device according to (9), wherein
the second antenna is turned overall.

(11) The electronic device according to any of (9) to (10), wherein
the wireless communication is wireless communication by a cellular method.

(12) The electronic device according to any of (1) to (10), wherein
the wireless communication is wireless communication in a satellite positioning system.

(13) The electronic device according to any of (1) to (10), wherein
the wireless communication is wireless communication by a wireless LAN.

(14) The electronic device according to any of (1) to (10), wherein
at least a back surface is covered with a metal plate.

(15) The electronic device according to (14), wherein
a slit is provided in a side that is a part of the metal plate and corresponds to a position at which the first antenna is provided.

(16) The electronic device according to any of (1) to (13), wherein
a front surface is covered with plastic or glass.

(17) The electronic device according to any of (1) to (16), wherein
at least a part of the first antenna is formed in a frame of a side surface.

(18) The electronic device according to any of (1) to (17), wherein
the second antenna is provided between the display and a support member of the display or a circuit substrate that operates the electronic device.

(19) An antenna including:
a first antenna for wireless communication; and
a second antenna for near-field communication that forms a loop by being used together with the first antenna, at least a part of the second antenna being positioned at a back surface of a display region of a display.

What is claimed is:
1. An electronic device, comprising:
a first antenna for wireless communication, the first antenna positioned on a periphery of the electronic device and outside of a display region of a display;
a second antenna for near-field communication, the second antenna positioned separate from the first antenna and at a back surface of the display region of the display; and
a first filter and a second filter, the first antenna and the second antenna being connected via the first filter and the second filter so that one turn of a loop antenna for the near-field communication is formed by a combination of the first antenna, the second antenna, the first filter and the second filter, wherein
the first filter and the second filter respectively pass a first signal of a first frequency band used in the near-field communication to the first antenna, and
the first filter and the second filter respectively block inflow of a second signal of a second frequency band used in the wireless communication into the second antenna.

2. The electronic device according to claim 1, further comprising:
at least one communication characteristic adjustment unit that is connected to the first antenna and adjusts a characteristic of the wireless communication.

3. The electronic device according to claim 2, wherein the communication characteristic adjustment unit includes a third filter that passes the second signal of the frequency band used in the wireless communication.

4. The electronic device according to claim 2, wherein the communication characteristic adjustment unit includes a matching circuit.

5. The electronic device according to claim 1, wherein the near-field communication is near-field non-contact communication or near-field non-contact charging.

6. The electronic device according to claim 5, wherein a first antenna feed for the near-field non-contact communication or the near-field non-contact charging is connected to the second antenna.

7. The electronic device according to claim 5, wherein the second antenna is shared in the near-field non-contact communication and the near-field non-contact charging.

8. The electronic device according to claim 7, wherein a first antenna feed for the near-field non-contact communication and a second antenna feed for the near-field non-contact charging are connected to the second antenna.

9. The electronic device according to claim 1, wherein at least a part of the second antenna is positioned at an orientation perpendicular to the display.

10. The electronic device according to claim 9, wherein the second antenna is positioned at an orientation perpendicular to the display.

11. The electronic device according to claim 1, wherein the wireless communication is wireless communication by a cellular method.

12. The electronic device according to claim 1, wherein the wireless communication is wireless communication in a satellite positioning system.

13. The electronic device according to claim 1, wherein the wireless communication is wireless communication by a wireless LAN.

14. The electronic device according to claim 1, wherein at least a back surface is covered with a metal plate.

15. The electronic device according to claim 14, wherein a slit is provided in a side that is a part of the metal plate and corresponds to a position at which the first antenna is provided.

16. The electronic device according to claim 1, wherein a front surface is covered with plastic or glass.

17. The electronic device according to claim 1, wherein at least a part of the first antenna is formed in a frame of a side surface.

18. The electronic device according to claim 1, wherein the second antenna is provided between the display and a support member of the display or a circuit substrate that operates the electronic device.

19. The electronic device according to claim 1, wherein
one end of the first antenna is connected to the first filter,
another end of the first antenna is connected to the second filter,
one end of the second antenna is connected to the first filter, and
another end of the second antenna is connected to the second filter.

* * * * *